United States Patent [19]
Estes

[11] Patent Number: 5,729,754
[45] Date of Patent: Mar. 17, 1998

[54] ASSOCIATIVE NETWORK METHOD AND APPARATUS

[76] Inventor: Mark D. Estes, 4509 Bunny Run VI, Austin, Tex. 78746

[21] Appl. No.: 443,282

[22] Filed: May 17, 1995

Related U.S. Application Data

[63] Continuation-in-part of Ser. No. 218,333, Mar. 28, 1994.
[51] Int. Cl.$^6$ .................................................. G06F 13/00
[52] U.S. Cl. .................. 395/800; 395/200.1; 364/238.2; 364/242.94; 364/284.4; 364/DIG. 1
[58] Field of Search .................................. 395/21, 200.02, 395/200.1, 200.15, 200.2, 800; 370/14, 53, 54, 67, 85.7, 95.1; 340/825.06, 826

[56] References Cited

U.S. PATENT DOCUMENTS

| | | | |
|---|---|---|---|
| 2,168,886 | 8/1939 | Roberts | 250/227.22 |
| 3,516,529 | 6/1970 | Shurtliff | 400/667 |
| 3,581,003 | 5/1971 | Leone et al. | 178/17 |
| 3,758,785 | 9/1973 | Maute | 250/229 |
| 3,886,544 | 5/1975 | Narodny | 340/365 |
| 4,278,965 | 7/1981 | Nelson et al. | 340/365 |
| 4,417,824 | 11/1983 | Paterson et al. | 400/477 |
| 4,679,186 | 7/1987 | Lea | 370/14 |
| 4,745,630 | 5/1988 | Underwood | 377/29 |
| 4,905,163 | 2/1990 | Garber et al. | 364/513 |
| 5,043,920 | 8/1991 | Malm et al. | 364/521 |
| 5,182,466 | 1/1993 | Ohkubo | 307/127 |
| 5,189,416 | 2/1993 | Estes | 341/26 |
| 5,289,365 | 2/1994 | Caldwell | 364/138 |
| 5,301,284 | 4/1994 | Estes et al. | 395/400 |

OTHER PUBLICATIONS

Mark Wells "Aspects of Language Design for Combinatorial Computing," *IEEE Transactions on Electronic Computers*, Aug. 1964, pp. 431–438.

Bernard Cole, "The Art of Building a Multimedia Computer," 1995 Systems Design Guide (Electronic Engineering Times: Manhasset, N.Y. 1995), pp. 6–12.

(List continued on next page.)

*Primary Examiner*—Alpesh M. Shah
*Attorney, Agent, or Firm*—David Newman & Associates, P.C.

[57] ABSTRACT

A reconfigurable, associative network apparatus and method. During a configuration phase of the associative network apparatus, active signals corresponding to wanted input patterns are configured as an associative network and distinguished from signals corresponding to unwanted input patterns; wanted input patterns can be further associated with output patterns corresponding to wanted responses. During an operational phase of a previously configured associative network, input patterns are formed from signals produced by one or a plurality of activated inputs. Selected input patterns are then filtered from a set of possible input patterns, and output patterns are obtained in response to a particular set of connections between input and output signals. An adaptive chord keyboard system, representative of a large class of polymorphic control systems, is disclosed as an illustrative embodiment permitting dynamic association of key codes to symbol sets for readily adapting to user capabilities, limitations, and preferences.

26 Claims, 37 Drawing Sheets

OTHER PUBLICATIONS

Allen Newell, "On Programming a Highly Parallel Machine to be an Intelligent Technician," *Proceedings of the Western Joint Computer Conference*, IRE–AIEE–ACM 1960, pp. 267–282.

Siegel et al., "A Survey of Interconnection Methods for Reconfigurable Parallel Processing Systems," Proceedings National Computer Conference, 1979, pp. 529–542.

George Wier, "Living with Complex Interactive Systems," *Human–Computer Interactve and Complex Systems*, Wier and Alty eds, (Academic Press: London 1991), pp. 1–21.

Morten Lincl, "Representations and Abstractions for Interface Design Using Multilevel Flow Modelling", *Human–Computer Interaction and Complex Systems*, Wier and Alty eds. (Academic Press: London 1991), pp, 223–243.

Janos Sztipanovits, "Toward Structural Adaptivity," Proceedings ISCAS'88, IEEE Press 1988, pp. 2359–2361, 2364–2366.

McMilkes, et al., "The Multigraph Approach to Parallel, Distributed, Structurally Adaptive Signal Processing", Proceedings ISCAS'90, IEEE Press 1990, pp. 2037–2040.

Mucdocca, *A Digital Design Methodology for Optical Computing* (MIT Press: Cambridge, MA 1990), pp. 43–45, 58–98.

T. H. Nelson, "The Right Way to Think about Software Design," *The Art of Human–Computer Interface Design*, B. Laurel, ed. (Addiison–Wesley: Reading, MA 1990), pp. 235–243.

Joe Marks, "A Syntax and Semantics for Network Diagrams," 1990 IEEE Workshop on Visual Languages (IEEE Computer Pressi Los Altimos, CA 1990), pp. 104–110.

Terry Patten, *Systemic Text Generation as Problem Solving*, (Cambridge University Press: Cambridge, MA 1988), pp. 19–27, 96–103, Terry Winograd, *Language as a Cognitive Process*, (Addison–Wesley: Reading, MA 1983), pp. 289–294, Harold Thimbley, *User Interface Design*, (Acm Pressi NY 1990) pp. 232–234.

Chisven and Duckworth, "Content–Addressable and Associative Memory: Alternatives to the Ubiquitous Ram", *IEEE Computer* (IEEE Press: NY), Jul. 1989, pp. 51–64.

Clark and Lutz, *Connection in Context* (Springer–Verlag: London 1992) pp. 1, 150–153.

system network for English pronouns

Fig. 3A
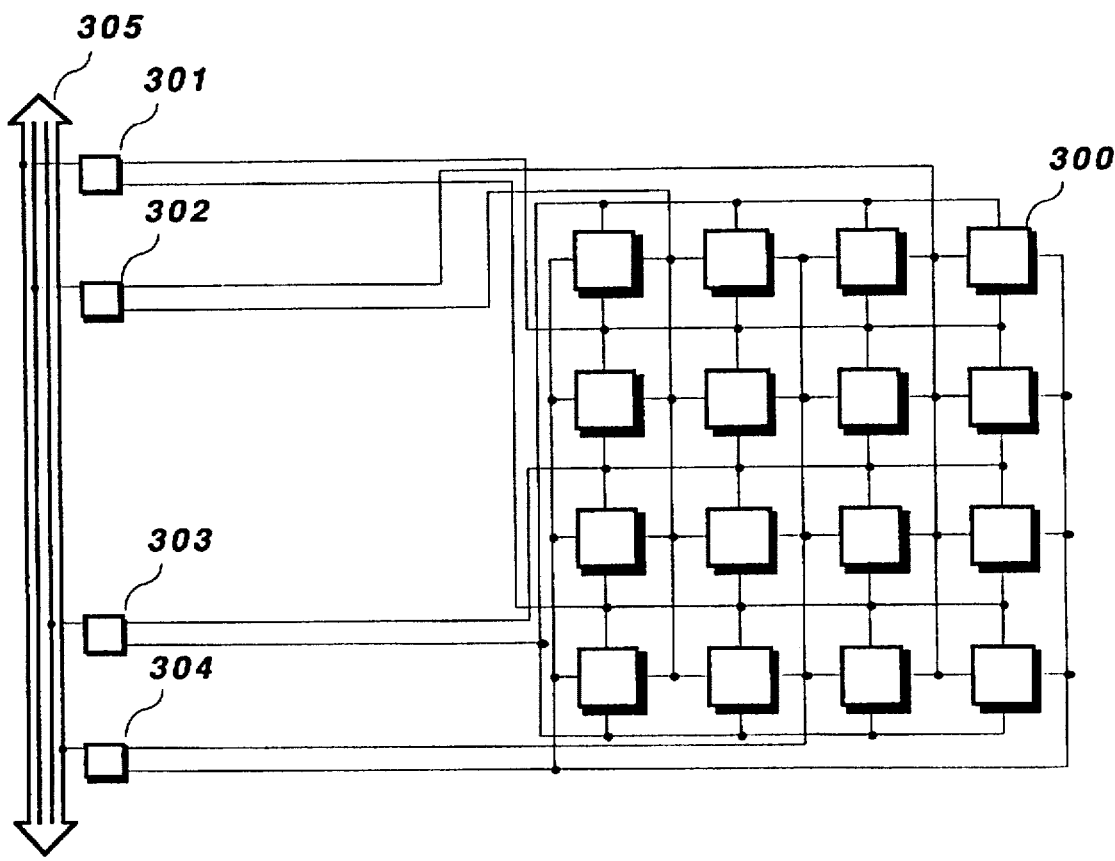
Fig. 3B
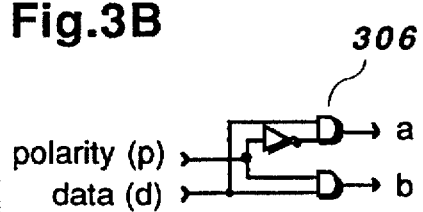
Fig. 3C
| p | d | a | b |
|---|---|---|---|
| 0 | 0 | 0 | 1 |
| 0 | 1 | 1 | 0 |
| 1 | 0 | 1 | 0 |
| 1 | 1 | 0 | 1 |

314 control signals
0 - 000 - quiescent
1 - 001 - configure logical polarity
315 2 - 011 - input data pattern
3 - 010 - input selection level
4 - 110 - input reference pattern
5 - 111 - global reset
6 - 101 - output associated pattern
7 - 100 - configure I/O pattern

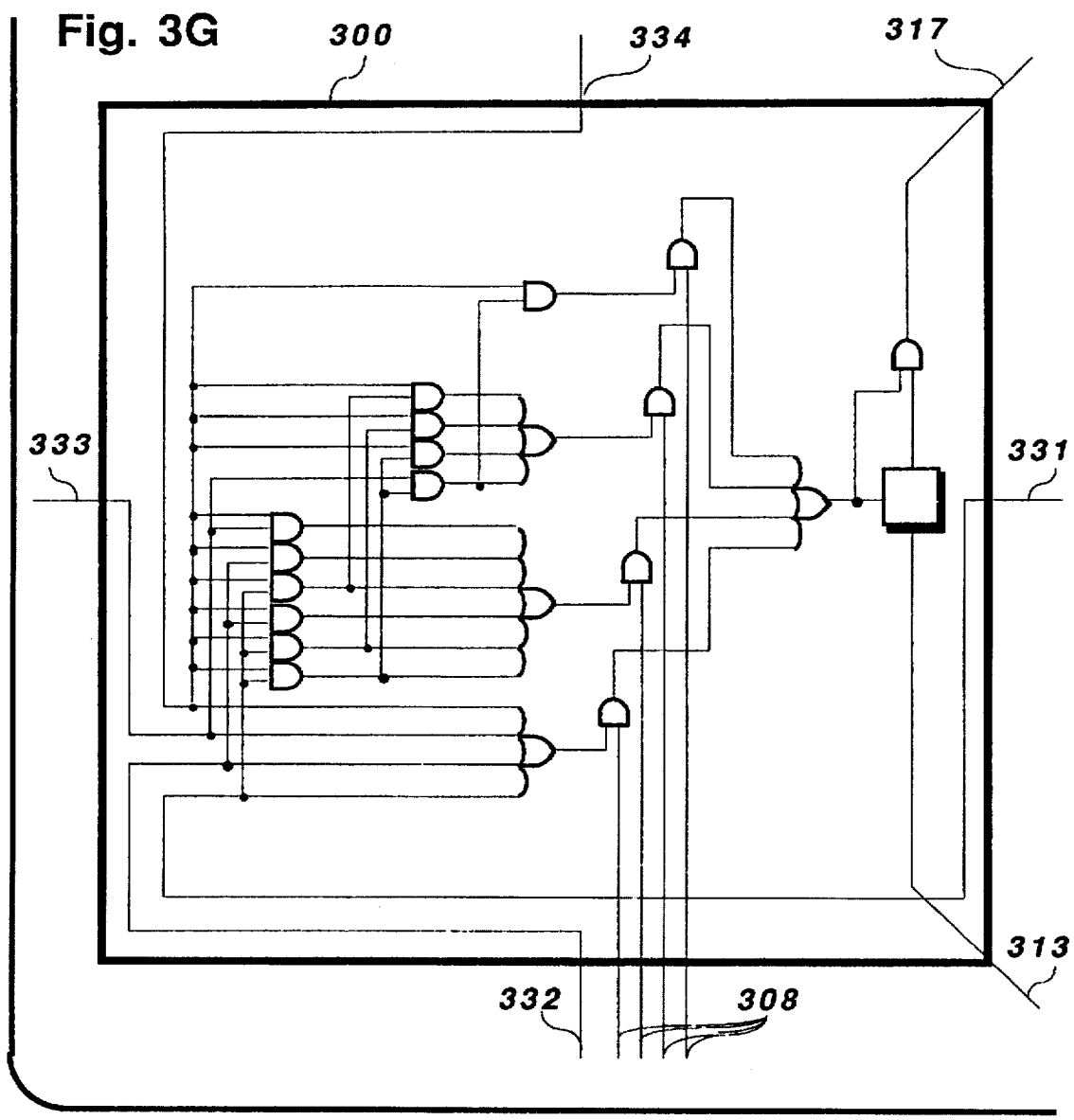

Fig. 5B

|     | 540  |     | 541 |
|-----|------|-----|-----|
| 542 | A B  | C D | 543 |
| 544 | 0 0  | 0 0 | 545 |
| 546 | 0 1  | 0 1 | 547 |
| 548 | 1 0  | 1 1 | 549 |
|     | 1 1  | 1 0 |     | user configuration system network user configuration system network

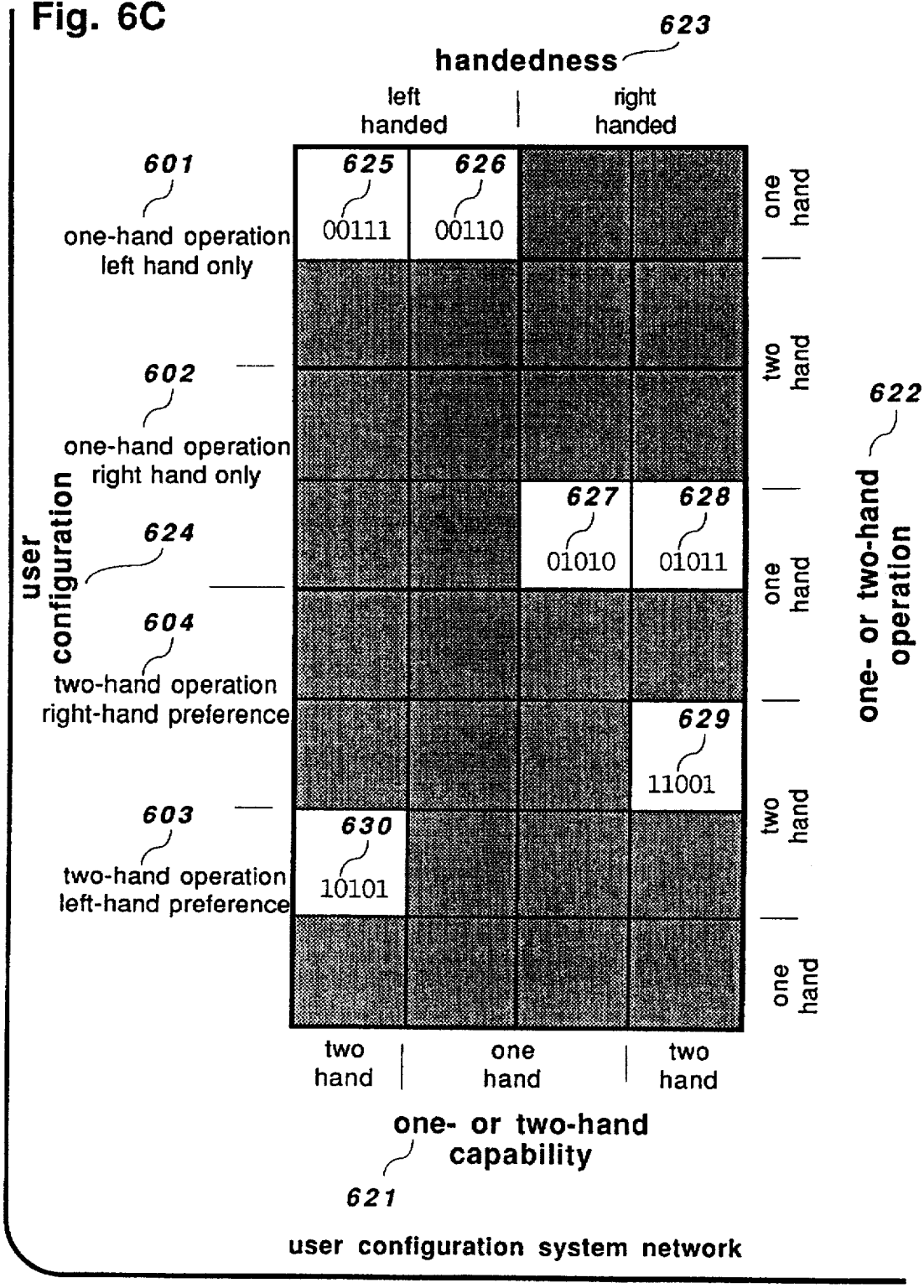

Fig. 7A
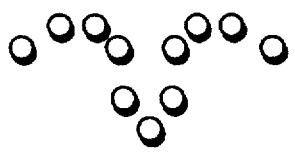
Fig. 7B
```
         LF3  LF2           RF2  RF3
   LF4        LF1      RF1           RF4
              LT1      RT1
                 LT2/RT2
```
Fig. 7C
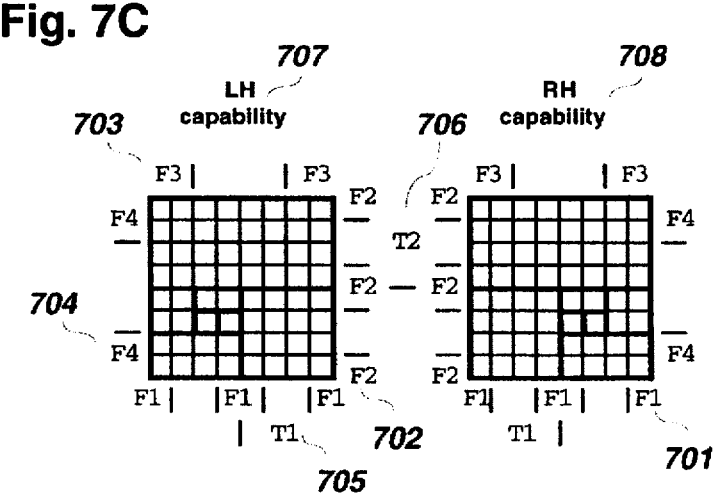

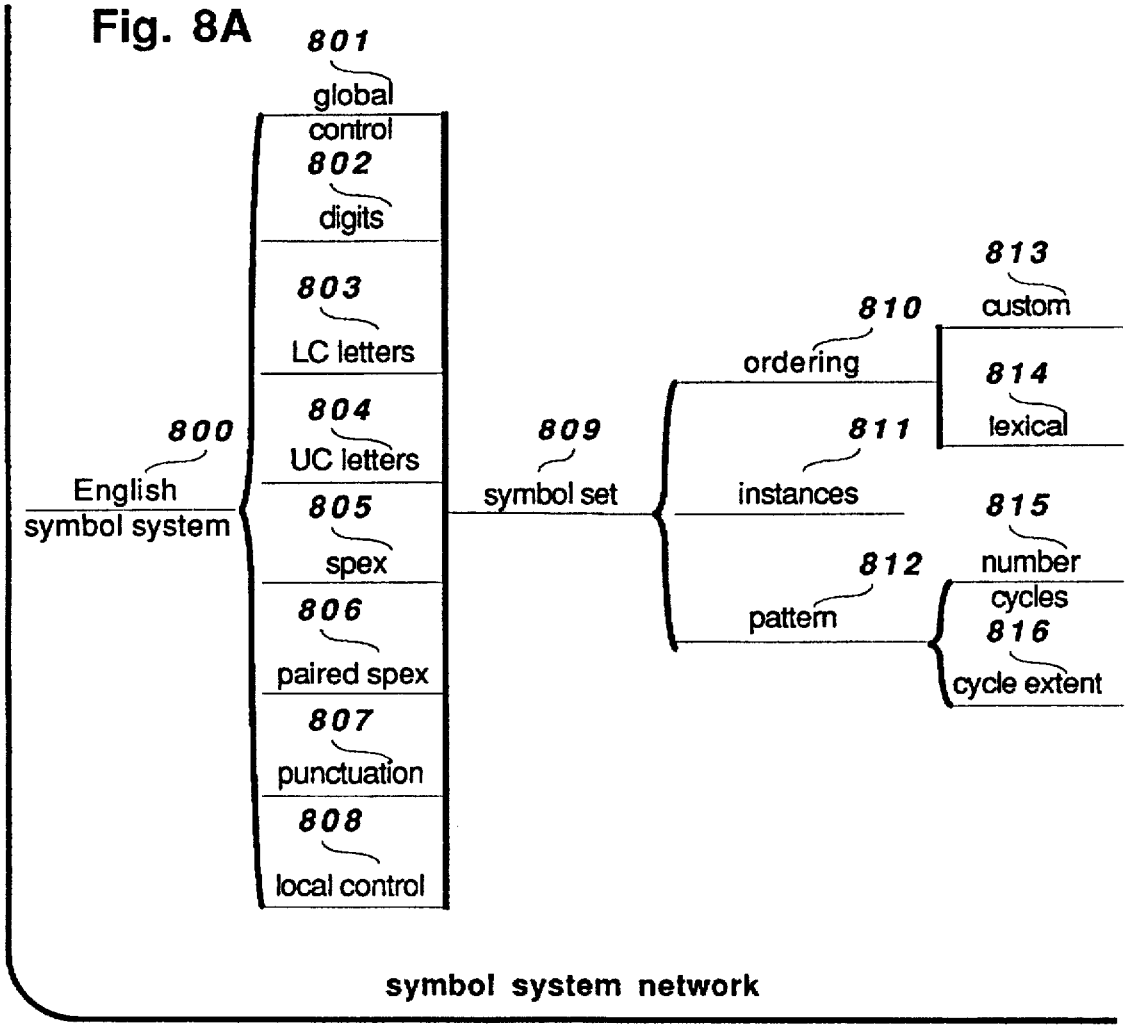

global control number of cycles digits number of cycles lower case letters number of cycles upper case letters number of cycles punctuation number of cycles special characters (spex)

number of cycles paired spex number of cycles local control number of cycles lower case letters upper case letters punctuation special characters (spex)

paired spex local control

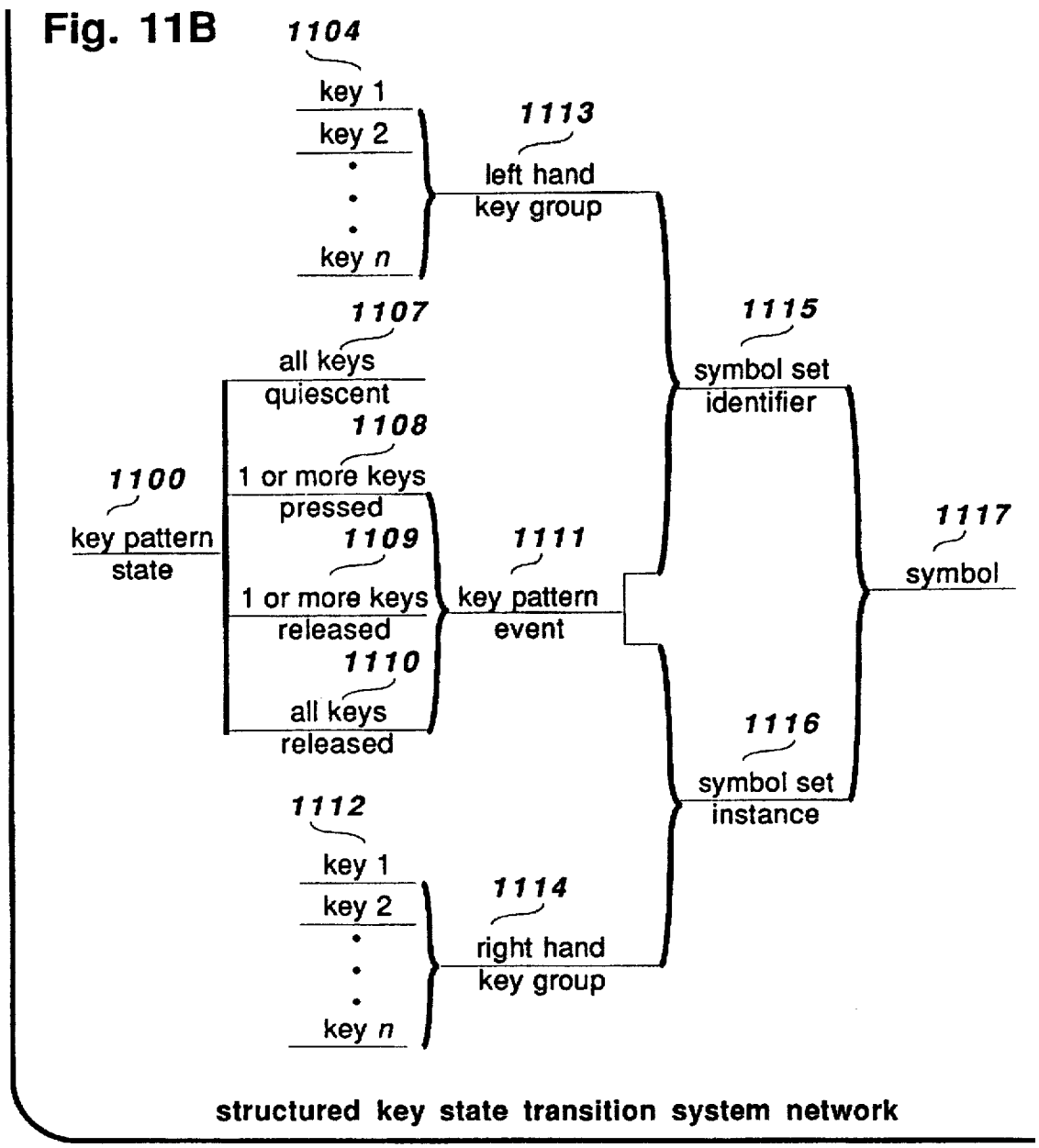

ASSOCIATIVE NETWORK METHOD AND APPARATUS

RELATED PATENTS

The application stems from a continuation-in-part patent application of co-pending U.S. patent application Ser. No. 08/218,333, filing date of Mar. 28, 1994, entitled, POLYMORPHIC NETWORK METHOD AND APPARATUS, which is incorporated herein by reference. The benefit of common matter is claimed pursuant to 35 U.S.C. § 120.

BACKGROUND OF THE INVENTION

The present invention generally relates to the field of polymorphic control systems and, more particularly, to an improved adaptive interface method and reconfigurable processor apparatus for integrating internal and external control systems.

DESCRIPTION OF THE RELEVANT ART

In a paper by Mark Wells, "Aspects of Language Design for Combinatorial Computing," *IEEE Transactions on Electronic Computers*, Aug. 1964, pp. 431–438, a large and growing class of computations which are combinatorial rather than arithmetic in nature is characterized as manipulations with sets, patterns and labels rather than with numbers. "Historically, both machines and languages have been inadequate for combinatorial computing." Whereas for external user interfaces, the primary consideration is convenience, the primary consideration for machine design is performance. According to Wells, the user "wishes to have the facility to perform the required operations and produce his results as quickly as possible. Thus, there arises an important interaction between the machine and language design."

Multimedia computing is an ambiguous form of combinatorial computing which, while difficult to define, is characterized by the juxtaposition of low level signal processing requirements, multiple levels of indirection, and high level user interface requirements. In the context of digital data transmission, multimedia information content is currently expressed in terms of bits manipulated to mix and match text, color, speed, and audio/video protocols for presentation to a user. Bernard Cole in his article, "The Art of Building a Multimedia Computer," 1995 *Systems Design Guide*, Electronic Engineering Times, Manhasset, N.Y., 1995, pp. 6–12, describes the realization of a multimedia computer architecture as "a tortuous and serpentine path." Cole reports general agreement that a conventional CISC/RISC-based central processing unit may not be enough to handle all functions required without some form of high-performance, real-time digital signal processing. There is no such agreement, however, on how to implement the required functions in hardware: as dedicated algorithmic engines with specific functions hardwired into the gates; as firmware programmable circuits with various DSP instructions implemented in ROM to be decoded and executed by special-purpose DSP/RISC engines; or as fully (user) programmable DSP/RISC engines. Ambiguous implementation issues are a reflection of broadly ranging application requirements including video and audio capturing and authoring, multimedia playback, and teleconferencing. Teleconferencing, for example, may require the integration of speech-to-text conversion, text-to-speech conversion, and audio/video/image/text compression for voice, fax, and data transmission and reception. Ambiguity notwithstanding, the persistent notion of multimedia computing is indicative of a continuing demand for adaptive architectures which integrate diverse functionality while offering improved usability and reliability over conventional systems.

George Wier in his paper "Living with Complex Interactive Systems," *Human-Computer Interaction and Complex Systems*, Wier and Alty eds., Academic Press, London, 1991, pp. 1–21, describes the underlying issues posed by multimedia systems as being intrinsic to a large class of complex interactive systems manifest in many areas which embrace sophisticated control techniques in combination with human operators, from large-scale industrial control systems to many of the interactive devices we meet in daily life. According to Wier, "the degree to which the task domain proves dynamic, is composed of many interconnected parts, ... determines the joint performance of any combined man and machine system."

U.S. Pat. No. 4,905,163 "DYNAMIC INFORMATION PRESENTATION AND NAVIGATION," to Garber et al., issued Feb. 27, 1990, discloses a presentation system for organizing multimedia information into an n-dimensional space for presentation, navigation, and dynamic reorganization of selected concepts and categories based on user needs. Lines 33–40 of col. 6 describe a preferred SNETS system in which the user is allowed:

> ... to create, display, edit, store and browse through semantic nets with other forms of viewing information. A semantic net is a knowledge representation [emphasis added] which displays concepts and relationships between them in a graphical form in which concepts are represented as nodes and relationships are represented as links between nodes.

Semantic nets in general and the SNETS system in particular are examples of systems described by Lind, referenced above, as interactive control systems having deficiencies which arise from an inappropriate distinction between the fundamental issues of presentation and representation. Because a separate link is required to map a relation between a first node and each of a plurality of nodes, levels of indirection, iterative enumeration, order of enumeration, and redundant references are problems which contribute to deficiencies associated with semantic nets in general and the SNETS system in particular as efficient representation structures. Network implementations realized in a linear computer memory as lists of elements are variously indexed by embedding pointers in the lists to encode nonlinear conceptual structures. A pointer only names the address of a "container" location in memory. Nothing about the "contents" of a memory location can be inferred from the pointer. Pointers can be arranged to implement structured relationships between locations in memory, but even in networks the linking of nodes does not in itself express much information. Unless some particular relation is specified, each link "means" only that items are associated. The links must be labeled, carrying fully as much information as the nodes. Furthermore, the need to categorize network links results in additional levels of indirection.

U.S. Pat. No. 5,043,920 "MULTI-DIMENSION VISUAL ANALYSIS," to Malm and Melley, issued Aug. 27, 1991, discloses an improved technique for processing and displaying multidimensional objects which convey global information concerning circuits employing networks of information. Rather than presenting one aspect of a problem at a time, colors and shading techniques highlight multiple functions correlated from a plurality of networks, allowing the common source of a problem to be more readily traced and deciphered. Lines 20–24 of col. 4 describe the manner in which an overall view of many nets is accomplished:

To see the global view of the system, the nets must be represented by a three-dimensional volume in space and time on the graphic display. The three-dimensional volume draws the net as a line in three-dimensional space with color changes for state transitions.

There exists a long-felt need for an implementation methodology which achieves modular continuity at all levels of expression, including high-level problem formulation, internal representation, and low-level execution. Allen Newell in his paper "On Programming a Highly Parallel Machine to be an Intelligent Technician," *Proceedings of the Western Joint Computer Conference*, IRE-AIEE-ACM, 1960, pp. 267–282, states "We need a 'problem-oriented machine' instead of a 'machine-oriented machine'—and such a machine, truly conceived, is equivalent to an intelligent assistant." Newell continues, stating "In current machines and coding a large discontinuity exists between the machine level and all structures built up from this level." Newell further suggests that continuity between the machine level and all structures built up from it can be achieved in "problem-oriented machines" by satisfying a "principle of homogeneity, according to which a module and a higher unit cannot be distinguished by any of the conventions for dealing with them." The principle of homogeneity requires a correspondence between what is to be represented in a machine (external view) and the corresponding form of the machine (internal view). Ideally, the principle of homogeneity suggests a further correspondence between the internal representation and the corresponding presentation. The present invention demonstrates continuity between the machine level and all structures built up from this level in a manner not taught by the prior art.

Morten Lind in his paper "Representations and Abstractions for Interface Design," *Human-Computer Interaction and Complex Systems*, Wier and Alty eds., Academic Press, London, 1991, pp. 223–253, suggests that deficiencies in the development of interactive control systems often arise from the failure to distinguish between the fundamental issues of presentation and representation. The relationship between presentation and representation is not always a function of relations between ends and means in the controlled system.

If we consider self-organizing systems, i.e., systems which either organize system resources as a response to changing goals or change goals as a response to changes in system capabilities, the notion of levels [of representation] becomes problematic. In this case, the ordering of system resources by means-end relations becomes a dynamic feature of the system and the planning of the content for the information interface to the system [presentation] cannot be based on these relations. Accordingly, special consideration should be given to the representation problems of systems with self-organizing features.

T. H. Nelson in his article "The Right Way to Think About Software Design," *The Art of Human-Computer Interface Design*, B. Laurel, ed., Addison-Wesley, Reading, Mass., 1990, p. 241, in the section "Representing Interconnected Information," describes the fundamental difficulty in providing continuity between representation and presentation:

Once we leave behind "two-dimensionality" (virtual paper) and even "three dimensionality" (virtual stacks), we step off the edge into another world, into the representation of the true structure and interconnectedness of information. To represent this true structure, we need to indicate multidimensional connection and multiple connections between entities. . . . Tomorrow's file servers . . . will maintain various types of connections among files or documents. But that is just the technical mechanism for holding the connections. How will we actually see and use them?

The present invention is related to a method for generating and visualizing object spaces which mechanize higher order relationships between attributes. Attributes describe a particular domain selected from a large class of combinatorial problems. As disclosed in U.S. Pat. No. 5,301,284 "MIXED-RESOLUTION, N-DIMENSIONAL OBJECT SPACE METHOD AND APPARATUS," issued Apr. 5, 1994, to Estes and Walker, continuity between presentation and representation is accomplished by formalizing a correspondence between external attribute names and internal names for spatial locations. These internal names encode attribute relationships as well as their respective identities.

Polymorphism is a fundamental property which generally refers to the capability of assuming different forms. Prior art general-purpose computers whose function can be radically changed by changing their microcode (e.g., machine-level instruction set) are examples of one form of polymorphism. Siegel et al., in "A Survey of Interconnection Methods for Reconfigurable Parallel Processing Systems," *Proceedings National Computer Conference*, 1979, pp. 529–543, defines a system as being " . . . reconfigurable if it may assume several architectural configurations, each of which is characterized by its own topology of activated interconnections between modules." However, a significant performance penalty usually results when there is a mismatch between the structure of a problem and the communication structure of a fixed, underlying architecture.

Janos Sztipanovits, in his paper "Towards Structural Adaptivity," *Proceedings ISCAS'88*, IEEE Press, 1988, pp. 2359–2366 describes the adaptation process as having the ability to modify the structure of the processing system as well as its parameters, driven by changes in the environmental model. According to Sztipanovits, this process requires the symbolic representation of the structure of the processing system itself. The implementation of dynamically reconfigurable processing systems is a non-trivial task, in that, "the tasks of modeling the environment, the processing system, and their relationships constitute a complex representation problem." Joe Marks in his paper "A Syntax and Semantics for Network Diagrams," 1990 *IEEE Workshop on Visual Languages*, IEEE Computer Press, Los Altimos, Calif., 1990, p. 104, makes a higher-level distinction between representation and presentation mechanisms, "Deriving a network model for a particular real-world system is the modeling problem. Designing a network diagram to depict a particular network is the design problem." In a subsequent paper, "The Multigraph Approach to Parallel, Distributed, Structurally Adaptive Signal Processing," *Proceedings ISCAS'90*, IEEE Press, 1990, pp. 2037–2040, Sztipanovits characterizes structurally adaptive and dynamically reconfigurable systems as important ingredients in the design and development of robust large-scale signal processing systems for operation in complex nonstationary environments. Sztipanovits suggests the main difficulty is not so much the complexity of the individual modeling aspects, but "the representation of the interactions among them."

Murdocca in his book, *A Digital Design Methodology for Optical Computing*, MIT Press, Cambridge, Mass., 1990, pp. 93–94, observes that there is no fundamental reason for processor configuration to remain fixed throughout a computation when an externally precomputed control sequence can be "played back" by a configuration control mechanism. According to Murdocca:

... fixed interconnects logic is underutilized. If the wires in electronic circuits could be changed on demand, then smaller circuits could be made to yield the same performance as larger circuits. There are probably no reasonable means for doing this in electronics, so we may as well put the idea aside as a pipedream ... In the long run, the potential for a machine that dynamically reconfigures itself based on the state of the machine rather than in a predetermined control sequence is interesting, but for the most part is currently unexplored, so there is a great opportunity for progress in this area.

For the purposes of classification and comparison, combinational problem descriptions can be transformed into reduced problem descriptions (descriptions of subproblems), through the use of disjunctive (logical OR) operators and conjunctive (logical AND) operators. In his book *Systemic Text Generation as Problem Solving*, Cambridge University Press, Cambridge, 1988, pp. 24–27, 96–103, Terry Patten formally describes system network diagrams as a graph-like structure for illustrating a problem description/reduction process associated with systemic grammar. "System networks can be interpreted as AND/OR graphs and the processing of grammar can be interpreted as problem reduction."

Somewhat related to the process of problem reduction through the identification and utilization of relationships are the issues presented by the development of alternative or chordal keyboards. Harold Thimbleby in his book *User Interface Design*, ACM Press, New York, 1990, p. 232, presents the keyboard to illustrate space versus time tradeoff issues generally associated with communication bandwidth.

Information requires time and space to communicate. The more space that is used, the less time is necessary; conversely, the more time, the less space. The tradeoff is perhaps easiest to understand by imagining a keyboard. If the user is restricted to a two-key keyboard (very little space at all), typing a message—in a Morse code perhaps—would take ages. Alternatively, if there were lots of keys (taking up lots of space), some messages might even be transmitted by typing a single key—saving a great deal of time . . . Chord keyboards permit users to press more than one key at a time, and thus increase the effective space of the interface exponentially. Rather than provide millions of combinations of keys, chord keyboards are usually designed with fewer keys than conventional QWERTY keyboards— five keys on a chord keyboard can simulate 31 keys on a conventional one-at-a-time keyboard.

Reasons suggested by the literature for the failure of prior art chordal keyboards to achieve commercial success include what is referred to herein as the "transition" problem and the "association" problem. A solution to the transition problem, is disclosed in U.S. Pat. No. 5,189,416, "CHORDAL KEYBOARD METHOD AND APPARATUS," issued Feb. 23, 1993, to Estes, wherein the disclosed method permits any number of keys, including all keys, to be depressed and released simultaneously or sequentially in any sequence. The latter problem, that of association, is addressed below through discussion of an adaptive chord keyboard system. The transition problem is also addressed but with an alternative proposed solution.

U.S. Pat. No. 2,168,886, issued to D. A. Roberts in 1939, is an early disclosure of optical circuits showing rotatable prisms attached to keys which deflect light in air down a tube to a photocell. Multiple channels of light in air shining on associated phototubes are disclosed in U.S. Pat. No. 3,516, 529, issued to R. A. Shurtliff in 1970, wherein each key selectively blocks one or more channels of light when depressed, thus creating the desired coded signal. A keyboard with coded output using fiber optics is disclosed in U.S. Pat. No. 3,581,003, issued to Leone et al., in 1971, wherein an optical switch is an interrupted fiber optic with a mask blocking the light channel when the key is not actuated; the mask is removed from the channel when the key is depressed. A key device for an electronic input keyboard is disclosed in U.S. Pat. No. 3,758,785, "Key Operated Optical Switch", issued to Maute Sep. 11, 1973, and assigned to Licentia Patent-Vernaltungs GmbH, wherein a light interrupting element associated with a key is displaceable between a light emitting element and a light sensitive element, both mounted in a key housing. The key head comprises a shutter which, during displacement of the key head, either establishes a light path between two semiconductor elements or interrupts the light path which exists when the key head is in the inoperative position. Finally, in an optically actuated keyboard disclosed in U.S. Pat. No. 3,886,544, "Keyboard Using Optical Switching," issued to Narodny May 27, 1975, a single source of light is used to activate a plurality of photoelectric transducers using fiber optics.

More recently, prior art photoelectric keyboards typically comprise a matrix of intersecting channels with a light source at one end of each channel and a photocell at the other end. A key-operable shutter positioned at each channel intersection selectively intercepts light beams from intersecting light sources. The interception of light beams de-energizes photocells, whose state change is detected by appropriate circuitry which transmits an information signal to a host device. One problem with such systems is that light radiation from various light sources reflects through the matrix of intersecting light paths to erroneously activate associated photocells. Another problem associated with matrix photo-optical keyboards is the problem of "blind spots" which are created when an operator has one key depressed and keeps it depressed while depressing a second key. The first key blocks the light channels for a row and column. If the second key is in one of these same two light channels, the depression of the second key will not be registered. The blind spot problem is the optical equivalent of overlapping key code events, referred to in the literature as rollover.

U.S. Pat. No. 4,278,965, "Photo-Optical Keyboard Having N-Key Rollover," issued to Nelson et al., Jul. 14, 1981, and assigned to Burroughs, discloses a key having a pair of grooves oriented along the axis for both columns and rows to allow the passage of light. A momentary interruption of the light path normally occurs on the down stroke of the key and again on the release stroke. The electronics expect this second interruption and do not interpret it as a second depression of the same key. An additional light channel is required to determine if a key has been fully depressed by the operator.

U.S. Pat. No. 4,417,824, "Optical Keyboard with Common Light Transmission Members," issued to Paterson et al., Nov. 29, 1983, and assigned to IBM, describes two uniquely shaped light transmission members forming a keyboard detection assembly utilizing reflecting surfaces to bend light along a light transmission path so that light is transmitted along common column paths from the source to various row paths and thence along common row paths to sensors. Another object of the invention is to provide a photonic keyboard having simple key-state control circuitry, wherein a plurality of key sensors are actuated by a single light source.

The distinctions between the reconfigurable, associative network apparatus and method of the present invention and widely-known prior art addressed-based systems will become obvious to those skilled in the art in the Detailed Description of the Preferred Embodiment below. important distinctions must be noted, however, between the present invention and prior art content-addressable and associative memories. Chisvin and Duckworth in their paper, "Content-Addressable and Associative Memory: Alternatives to the Ubiquitous RAM," *IEEE Computer*, IEEE Press, New York, July, 1989, pp. 52, 57; define content-addressable and associative memories as follows:

[In content-addressable memories] . . . information is stored, retrieved, or modified based on the data itself, not its arbitrary storage location . . . A content-addressable memory has traditionally been a system of fixed and data words that can be matched exactly according to the contents of the word, so multiple responses are possible for each search key.

The term "associative memory" describes a more general storage and retrieval system that can access or modify cells based on their contents but does not need an exact match with a data key. Various recall methods are possible when using an associative memory for search and match operations . . . The retrieval keys must be stored explicitly for recall in this manner . . . The selected item will be the one that best matches the input data.

The reconfigurable, associative network apparatus of the present invention does not explicitly store input patterns, output patterns, tags or retrieval keys, but sets or clears relations between properties of input attributes and properties of response attributes, permitting associations between input/output pattern pairs to be changed dynamically in response to adaptive interface control methods.

A further distinction should be made between the reconfigurable, associative network apparatus and method of the present invention and associative network architectures associated with the field of neurocomputing. Associative networks are widely associated with a connectionist paradigm in a field trying to simulate intelligent processes. Clark and Lutz, in their book *Connectionism in Context*, Springer-Verlag, London, 1992, pp. 1,150–151, suggest that essential features of natural intelligence, including fluidity and adaptive robustness, motivate attempts ranging from fuzzy logic to meta-reasoning to attain adaptive flexibility for controlling complex systems. Connectionist systems, according to Clark and Lutz, " . . . remain on the whole very rigid and brittle compared with natural systems." Generally, statistical properties of weighted connections in a neural network device determine what output the device provides for a given pattern of inputs—the problem of finding a most highly associated output corresponding to an arbitrary input. According to Clark and Lutz, "each connection in such a network has an associated weight (or strength) which determines how important that connection is and how much influence the nodes connected by it can have on each other." By contrast, the apparatus and method of the present invention support a class of control systems characterized as having deterministic objectives of control, i.e., intentionality, by means of an interactive presentation mechanism which corresponds to an adaptive, combinatorially articulated representation mechanism.

OBJECTS OF THE INVENTION

A general object of the invention is an interactive network apparatus and method for enabling a plurality of elements arranged in a fixed physical configuration to be dynamically reconfigured, responsive to user preferences, into a plurality of logical configurations for recall based on user-selected associations.

Another object of the invention is a network notation system for configuring multidimensional relations in a particular contextual domain, mechanized to permit external control objectives to be interactively modified and changes to corresponding internal object representations to be dynamically implemented.

An additional object of the invention, is a method of input transition control illustrated by a chordal keyboard embodiment which permits any number of inputs, including all inputs, to be activated and deactivated simulataneously or sequentially in any sequence.

SUMMARY OF THE INVENTION

According to the present invention, as embodied and broadly described herein, an associative network apparatus and method for enabling a plurality of elements arranged in a fixed physical configuration to be dynamically reconfigured, responsive to user-input preferences, into a plurality of logical configurations for recall based on user-selected associations, is provided. During a configuration phase of the associative network apparatus, active signals corresponding to wanted input patterns are configured as an associative network, distinguishing them from signals corresponding to unwanted input patterns, and wanted input patterns are associated with output patterns corresponding to wanted responses. During an operational phase of a previously configured associative network, input patterns are formed from signals produced by one or a plurality of activated inputs. Selected input patterns are then filtered from a set of possible input patterns, and output patterns are obtained in response to a particular set of connections between input and output signals.

The apparatus of the present invention comprises a plurality of electrically-activated elements connected to a plurality of input circuits. The plurality of input circuits provide a plurality of input signals to the plurality of electrically-activated elements. The apparatus of the present invention may further comprise a control bus, electrically coupled to each of the plurality of input circuits, for controlling enablement of the plurality of input signals. Each of the plurality of input signals has a value corresponding to a logical one or a logical zero.

The apparatus further comprises a data bus, electrically coupled to each of the plurality of input circuits, for relaying the plurality of input signals, including signals from a user, to the plurality of input circuits. In response to a particular set of input signals comprising a unique logical name, a particular element within the plurality of electrically-activated elements corresponding to that unique logical name may be selected. In response to a particular set of input signals comprising a partial logical name, a subset of elements within the plurality of electrically-activated elements corresponding to that partial logical name may be selected.

Each of a plurality of logical polarity input switches may be electrically coupled to a respective input circuit to form a series of configuration control mechanisms. The configuration control mechanisms, which are electrically coupled to the data bus and to the plurality of electrically-activated elements, are responsible for setting and resetting a logical polarity of their respective input circuits. A polarity control circuit, electrically coupled to each of said plurality of logical polarity input switches, and an input control circuit, electrically coupled to each of said plurality of input circuits, may also be included.

The apparatus of the present invention may further comprise a plurality of selection level input circuits, each of the plurality of selection level input circuits electrically coupled to the plurality of electrically-activated elements and to the data bus, for setting and resetting an activation selection level. The activation selection level determines the scope of the logical name to be specified and thus the number of elements which are candidates for activating an associative link between an input pattern and a particular output pattern. The plurality of selection level input circuits may be controlled by a selection level control circuit, electrically coupled to the control bus and to each of the plurality of selection level input circuits.

The apparatus may additionally comprise a network element set/reset input circuit, electrically coupled to each of the plurality of electrically-activated elements and to the data bus, for setting and resetting a state of a selected element or for globally resetting a plurality of activated elements to a known state. The network element set/reset input circuit may be controlled by a network element set/reset control circuit, electrically coupled to the control bus and to the network element set/reset input circuit.

The associative network apparatus of the present invention may further comprise a plurality of output pattern circuits, electrically coupled to the data bus and to each of the plurality of electrically-activated elements. The plurality of output pattern circuits may be controlled by an output pattern control circuit, electrically coupled to the control bus and to the plurality of output pattern circuits. A plurality of logical polarity output switches, electrically coupled to the plurality of logical polarity input switches, respectively, may be included for controlling the logical polarity states of output patterns in correspondence with the logical polarity states of input patterns.

The apparatus may further comprise a plurality of output configuration circuits, electrically coupled to the data bus and to the plurality of output pattern circuits through a plurality of gated buffer control circuits. The plurality of output configuration circuits may be controlled by an output configuration control circuit, electrically coupled to the control bus and to the plurality of output configuration circuits. Each of said plurality of input circuits may be configured as an input or an output for relating a plurality of input patterns to a corresponding plurality of output patterns, respectively.

The present invention also includes a process for selecting an element in a polymorphic network apparatus having a plurality of elements configured as an N-dimensional object space. The said polymorphic network apparatus includes a plurality of input circuits, a data bus with a plurality of signal paths, and a control bus. The process comprises the steps of inputting, using the data bus, a polarity selection signal for each of the plurality of input circuits. The polarity selection signal may correspond to a logical one or a logical zero for reversing a logical polarity of a related input circuit or restoring the logical polarity of the related input circuit, respectively. In response to the polarity selection signal and a control signal from the control bus corresponding to a polarity switch enable signal, a logical polarity for each of the plurality of input circuits is set. The method then comprises the steps of activating, in response to the logical polarity setting defining a partial logical name, a selected set of elements within the plurality of elements defined by the partial logical name. In response to the logical polarity setting defining a full logical name, a selected element within the plurality of elements defined by the full logical name is selected.

The method may further comprise the steps of inputting an output pattern configuration signal, corresponding to an input data pattern, on the data bus; inputting a control signal, corresponding to an input/output pattern configuration enable signal, on the control bus; and associating, during a configuration phase of an associative network, active signals corresponding to wanted input patterns and distinguishing the active signals corresponding to wanted input patterns from signals corresponding to unwanted input patterns.

The method may further comprise the steps of inputting a reference pattern signal, corresponding to an input pattern and an associated output pattern, on the data bus; inputting a control signal, corresponding to an input pattern enable signal, on the control bus; and associating, during a configuration phase of an associative process, wanted input patterns with output patterns corresponding to wanted responses.

The method may also comprise the steps of inputting an input pattern signal, corresponding to an input data pattern, on the data bus; inputting a control signal, corresponding to an input data pattern enable signal, on the control bus; forming, during an operational phase of a previously configured associative network, input patterns from signals produced by a plurality of activated inputs; filtering selected input patterns from a set of possible input patterns; and determining output patterns in response to a particular set of connections between input and output signals.

In an illustrative embodiment of the present invention, a method of adapting the operation of a chordal keyboard controller to user capabilities, limitations, and preferences is presented, describing the detection of key patterns and their association to symbol sets.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIGS. 3A–3G illustrate a preferred embodiment of a dynamically reconfigurable I/O processor module;

FIGS. 5A–5C illustrate methods of the present invention for configuring and operating the preferred embodiment of a dynamically reconfigurable I/O processor module of FIG. 3F;

FIGS. 6A–6D show four different expressions of a process for specifying user capabilities and preferences in an adaptive chordal keyboard system;

FIGS. 7A–7D illustrate an exemplary key layout for further specifying user capabilities for interactively configuring an adaptive chordal keyboard system;

FIGS. 8A and 8B show a method of specifying a symbol system for configuring an adaptive chordal keyboard system;

FIGS. 11A and 11B are system network diagrams illustrating the key-state transition control problem as a sequence of asynchronously formed messages in response to a plurality of logically-related input activations;

DETAILED DESCRIPTION OF THE PREFERRED EMBODIMENTS

Figure 1A:
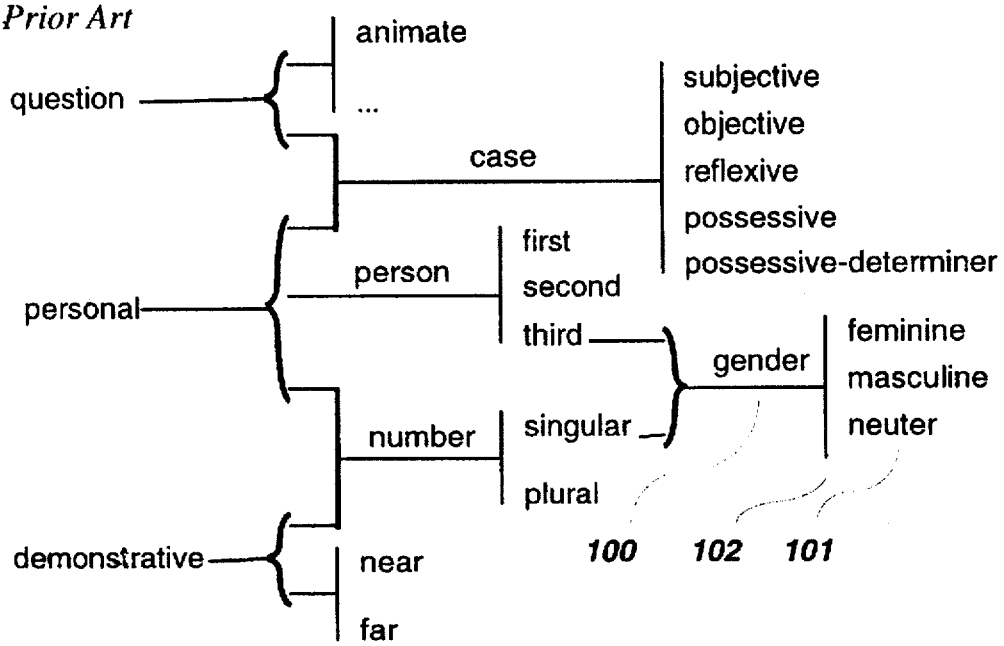
FIG. 1A shows a prior art system network for English pronouns, including the choices for personal, question, and demonstrative pronouns.

Reference now is made in detail to the present preferred embodiments of the invention, examples of which are illustrated in the accompanying drawings, wherein like reference numerals indicate like elements throughout the several views.

Figure 1B:
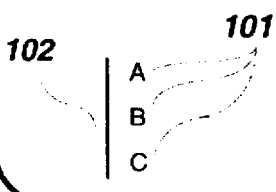
FIGS. 1B–1E illustrate various structural components related to prior art system networks.

As illustratively shown in the prior art representations of FIGS. 1A–1E, system network diagrams may be used to graphically identify the interrelationships between a number of elements and their roles in a given system. FIG. 1A, drawn from a book by Terry Winograd, *Language as a Cognitive Process*, Addison-Wesley, Reading, Mass., 1983, p. 293, shows a system network for English pronouns, including the choices for personal, question, and demonstrative pronouns. Such system networks are formal structures associated with the role of classification in systemic grammar which represent interdependencies among dimensions and choices. They convey an explicit analysis of the alternatives available within a language. Choices represented by system networks include identification of different functional roles and classification of each element. Each choice system 100, of FIG. 1A is represented by a set of feature names 101 aligned in a column to the right of a vertical bar 102 as shown in FIG. 1B.

Figure 1C:
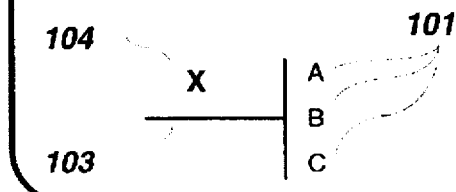

There are two complementary ways of describing choice systems: as sets of mutually exclusive feature labels or as classifications for the objects to which these labels can be applied. Saying that an object has a feature "A" is equivalent to saying that the object is in class "A." There are different contexts in which one or the other is clearer. A choice system describes an exhaustive partitioning. Every object to which the choice system applies can be assigned to one and only one of the subcategories, i.e., it possesses exactly one of these features. Each choice system can be named (for the purposes of exposition) and its name 103 written above a horizontal line 104 extending from the left of the vertical bar as shown in FIG. 1C. The system of FIG. 1C, named "X" 104, has three mutually exclusive choices: "A," "B," or "C" 101.

Figure 1D:
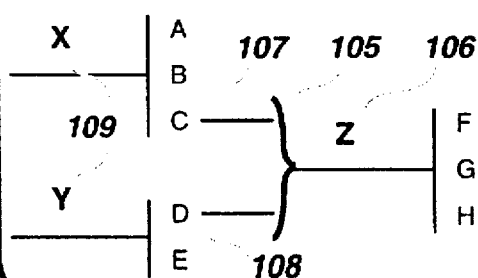
Figure 1E:
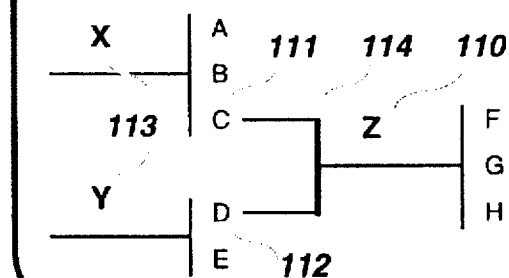

Choice systems can be related in various ways, with the simplest being a hierarchical dependency such as the phylum>family>genus>species of biological classification. In a hierarchically dependent relation between choice systems, a particular feature in one system is a necessary condition for the applicability of another. Each choice system is said to have an entry condition determining whether it is applicable to a given object, and dependence is represented by connecting the necessary feature to the dependent system. Often two orthogonal sets of choices are made— <species> and <gender>, both depending on the same entry condition represented within a brace 105 as shown in FIG. 1D. In the choice system of FIG. 1D, the entry condition for "Z" 106 involves the simultaneous selection of particular features "C" 107 and "D" 108 in two dimensions "X" and "Y" 109. In the choice system of FIG. 1E, the entry condition for "Z" 110 can be satisfied with either of two features "C" 111 or "D" 112 in dimensions "X" and "Y" 113. The vertical bar 114 of FIG. 1E represents a logical "OR," indicating that at least one of the features is necessary, while a brace 105 of FIG. 1D represents a logical "AND," indicating that all connected features are necessary to satisfy an entry condition.

Figure 2A:
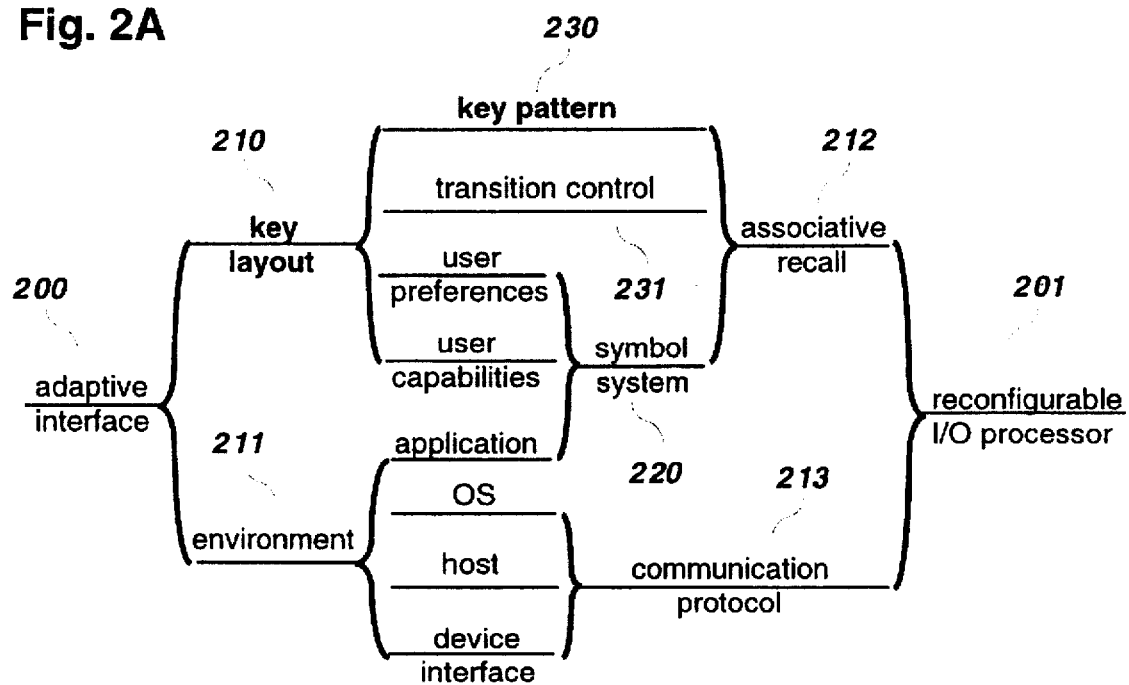
FIGS. 2A and 2B are system network diagrams showing constituent relationships integrating adaptive interface methods and an illustrative embodiment of a reconfigurable processor apparatus of the present invention.

In the system network diagram of FIG. 2A, seven choice systems 200, 201, 210, 211, 212, 213, 220 show relationships between an adaptive interface 200 and an illustrative embodiment of a reconfigurable input/output (I/O) processor 201 of the present invention. The relationships are crucial to the synthesis of integrated external and internal control systems, as choices between them permit external objectives of control to be interactively modified and changes to corresponding internal object representations to be dynamically implemented. The key layout system 210 of FIG. 2A, including the key pattern selection feature 230, enables the transition from general, fixed expression to an adaptive chord keyboard, described below as an illustrative embodiment permitting dynamic association of key codes to symbol sets for readily adapting user capabilities, limitations, and preferences, representative of a large class of polymorphic control systems.

Figure 2B:
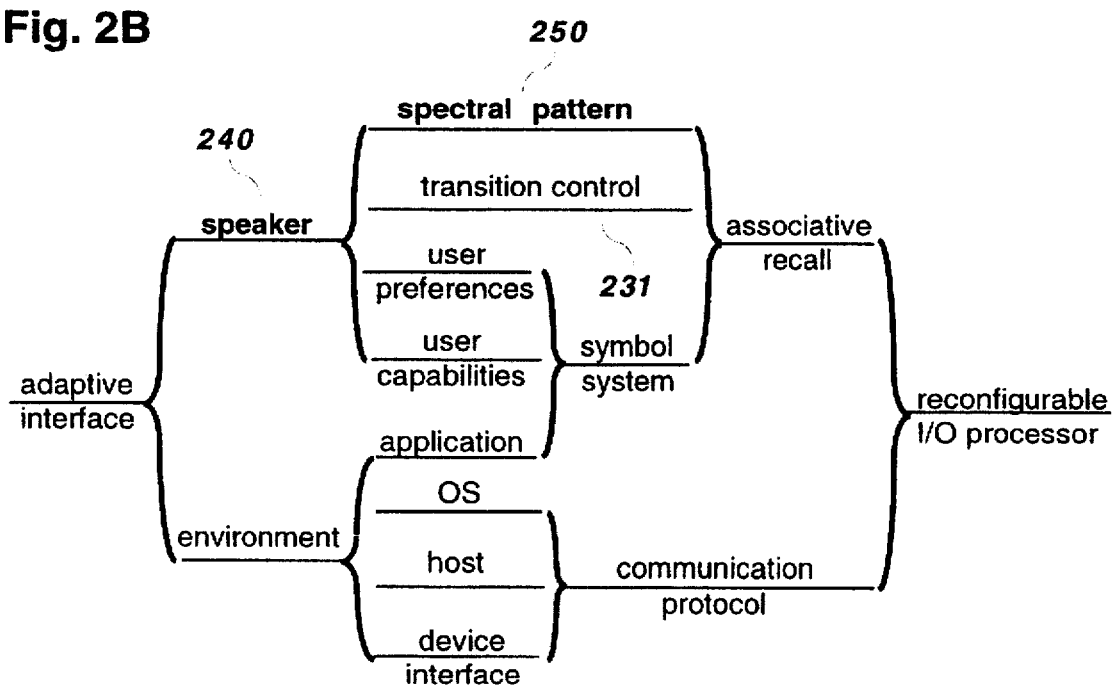

The system network diagram of FIG. 2B illustrates modification of the system network of FIG. 2A to similarly describe a voice recognition system. Such modification may be accomplished by renaming the key layout system 210 of FIG. 2A to speaker system 240 and by renaming the key pattern selection feature 230 of FIG. 2A to spectral pattern 250 of FIG. 2B.

The problem of input pattern detection, recognition and association with output patterns or actuator mechanisms is fundamental to the class of adaptive spectra processing applications including speech and character recognition, wherein a discrete signal event may comprise a plurality of formants. The transition control feature 231 of FIGS. 2A and 2B represents a problem common to such systems, i.e., continuous speech and connected writing. Referring to FIG. 2A, transition control 231 of key patterns 230 in an adaptive key layout system 210 is described below in AN ILLUSTRATED EMBODIMENT OF THE INVENTION as an example of integrated external and internal control systems which allow external objectives of control, i.e., a key layout 210, to be interactively modified and changes to corresponding internal object representations, i.e., key patterns 230, to be dynamically implemented.

FIGS. 3A–3G illustrate a preferred embodiment of a dynamically reconfigurable I/O processor module in accordance with an interconnection network apparatus disclosed in a co-pending U.S. patent application having Ser. No. 08/218,333, filing date of Mar. 28, 1994, entitled, POLYMORPHIC NETWORK METHOD AND APPARATUS, which is incorporated herein by reference.

FIG. 3A illustrates the interconnection network module of the present invention. A four-by-four array of elements, referred to herein as a module, is shown, wherein each element 300 is coupled to a first input circuit 301, a second input circuit 302, a third input circuit 303, and a fourth input circuit 304. Each input circuit 301, 302, 303, 304 is shown as a "dual-rail" input, coupled to a data bus 305. The dual-rail input allows a unique first set of eight elements to be coupled to a particular input circuit for an input signal corresponding to a logical one and a unique second set of eight elements to be coupled to a particular input circuit for an input signal corresponding to a logical zero. A logical name for selecting each element 300 is comprised of an input signal for each of four input circuits 301, 302, 303, 304 of FIG. 3A. Accordingly, only one element 300 can be four-connected, such that for a particular set of input signals for input circuits 301, 302, 303, 304 only one of sixteen elements is selected.

Elements 300 of the sixteen-element array or module of FIG. 3A are electrically coupled to input circuits 301, 302, 303, 304 in accordance with the method disclosed in U.S. Pat. No. 5,301,284 entitled MIXED-RESOLUTION, N-DIMENSIONAL OBJECT SPACE METHOD AND APPARATUS, for generating a 4-dimensional object space. Each dimension has one level of resolution, satisfying a principle of homogeneity that suggests a correspondence between an internal representation and the corresponding form of the machine.

FIGS. 3B and 3C illustrate logical expressions of a novel logical polarity control mechanism 306 which enables a plurality of elements 300, arranged in a fixed physical configuration, to be dynamically reconfigured into various logical configurations by manipulating the logical polarity of one or a plurality of input circuits 301, 302, 303, 304. A logical zero clears the logical polarity "p" of a related input circuit 301, 302, 303, 304 and a logical one sets the logical polarity "p") of a related input circuit 301, 302, 303, 304. Referring to the truth table of FIG. 3C, a first and second state of the logical polarity control mechanism 306 are shown with the logical polarity "p" as being clear. A third and fourth state of the logical polarity control mechanism 306 are shown with the logical polarity "p" as being set. The states of the dual-rail outputs "a" and "b" of the logical polarity control mechanism 306 corresponding to a data signal (d) for a related input circuit 301, 302, 303, 304 setting are reversed when the logical polarity "p" is changed.

Figures 3D, 3E:
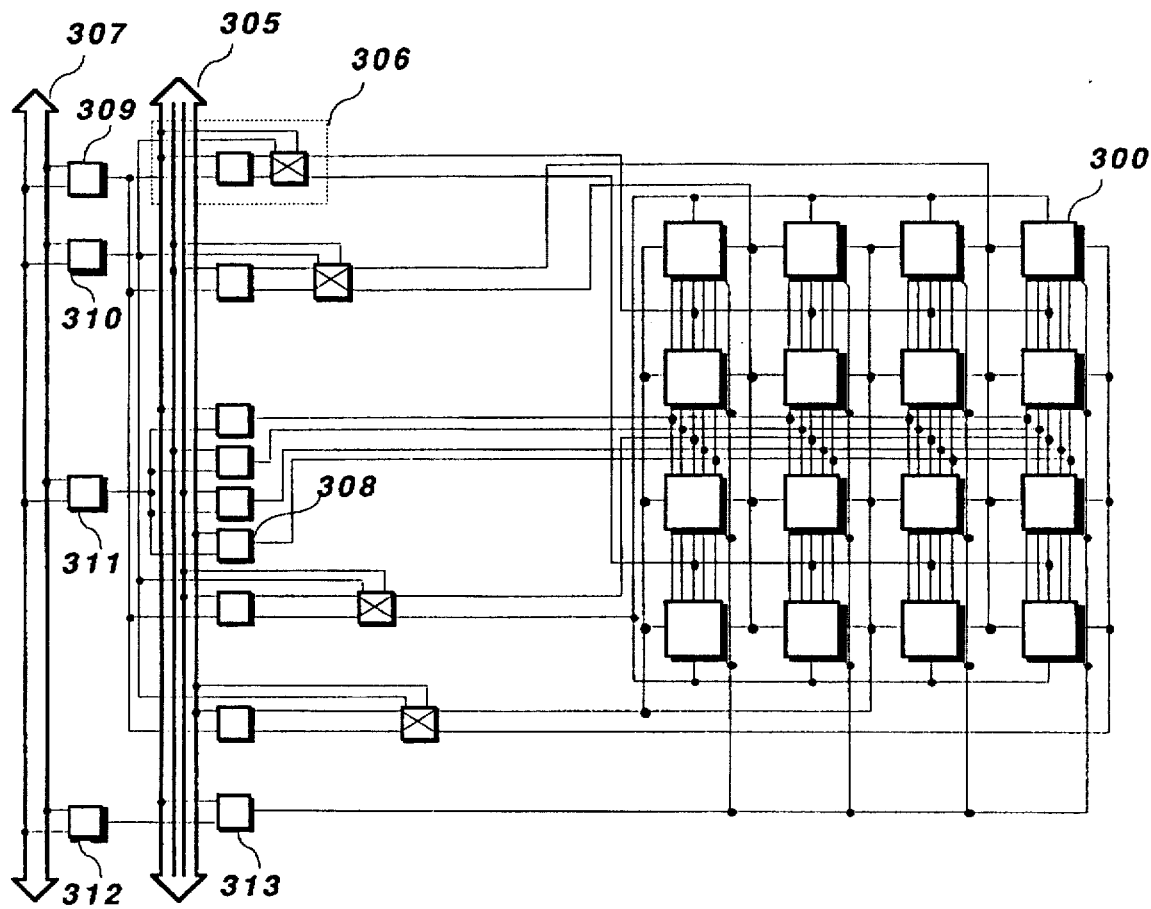

FIG. 3D is an enhanced embodiment of the interconnection network module of FIG. 3A. A first enhancement enables a plurality of elements 300 arranged in a fixed physical configuration to be dynamically reconfigured into various logical configurations by manipulating the logical polarity of one or a plurality of input circuits in accordance with a method and network apparatus fully disclosed in the co-pending U.S. patent application referenced above entitled, POLYMORPHIC NETWORK METHOD AND APPARATUS. The logical polarity control mechanism 306 of FIG. 3B is shown in FIG. 3D as a pair of functional blocks 306 representing a module input data signal and a related logical polarity signal, each coupled to a data bus 305 and a control bus 307. The module input data signal is further shown coupled to the control bus 307 by an input control circuit 309 for enabling a data signal sensed on the data bus 305 to propagate a logical zero to a first set of eight elements 300 and to propagate a logical one to a second set of eight elements 300 of the interconnection network module. A logical polarity signal of the logical polarity control mechanism 306 is further shown coupled to the control bus 307 by a polarity control circuit 310 for enabling data sensed on the data bus 305 to select a particular logical polarity control mechanism 306 and further causing the state of the selected logical polarity control mechanism 306 to be changed in accordance with truth table states of FIG. 3C described above. The logical polarity control mechanism 306 may operate by means of a logical polarity switch.

A second enhancement of the interconnection network module shown in FIG. 3D relates to concurrent selection of multiple elements 300 in accordance with a method and network apparatus fully disclosed in the co-pending U.S. patent application referenced above entitled, POLYMORPHIC NETWORK METHOD AND APPARATUS. Selection level input circuits 308 are shown coupled to a data bus 305 for determining if one or a plurality of elements is to be selected. Selection level input circuits 308 have the effect of determining whether the values of subsequent data inputs to the input circuits 301, 302, 303, 304 contribute to the logical name of an element selection event, thereby implementing a logical "don't care" for input circuits 301, 302, 303, 304. Selection level input circuits 308 are further shown coupled to a control bus 307 and to a selection level control circuit 311 which enables a selection level control signal to be broadcast to all network module elements 300, for selecting one or concurrently selecting a plurality of elements.

A third enhancement of the interconnection network module shown in FIG. 3D relates to the ability to globally reset the interconnection network module to a known state. As shown in FIG. 3E, a global reset control signal 315 causes devices enabled by the input control circuit 309, the polarity control circuit 310, the selection level control circuit 311, and the network element set/reset control circuit 312 of FIG. 3D to concurrently access data lines on the data bus 305 having signals which allow the logical polarity control mechanism 306 states and the selection level input circuits 308 states to be cleared and the state of the network elements 300 to be reset.

Figure 3F:
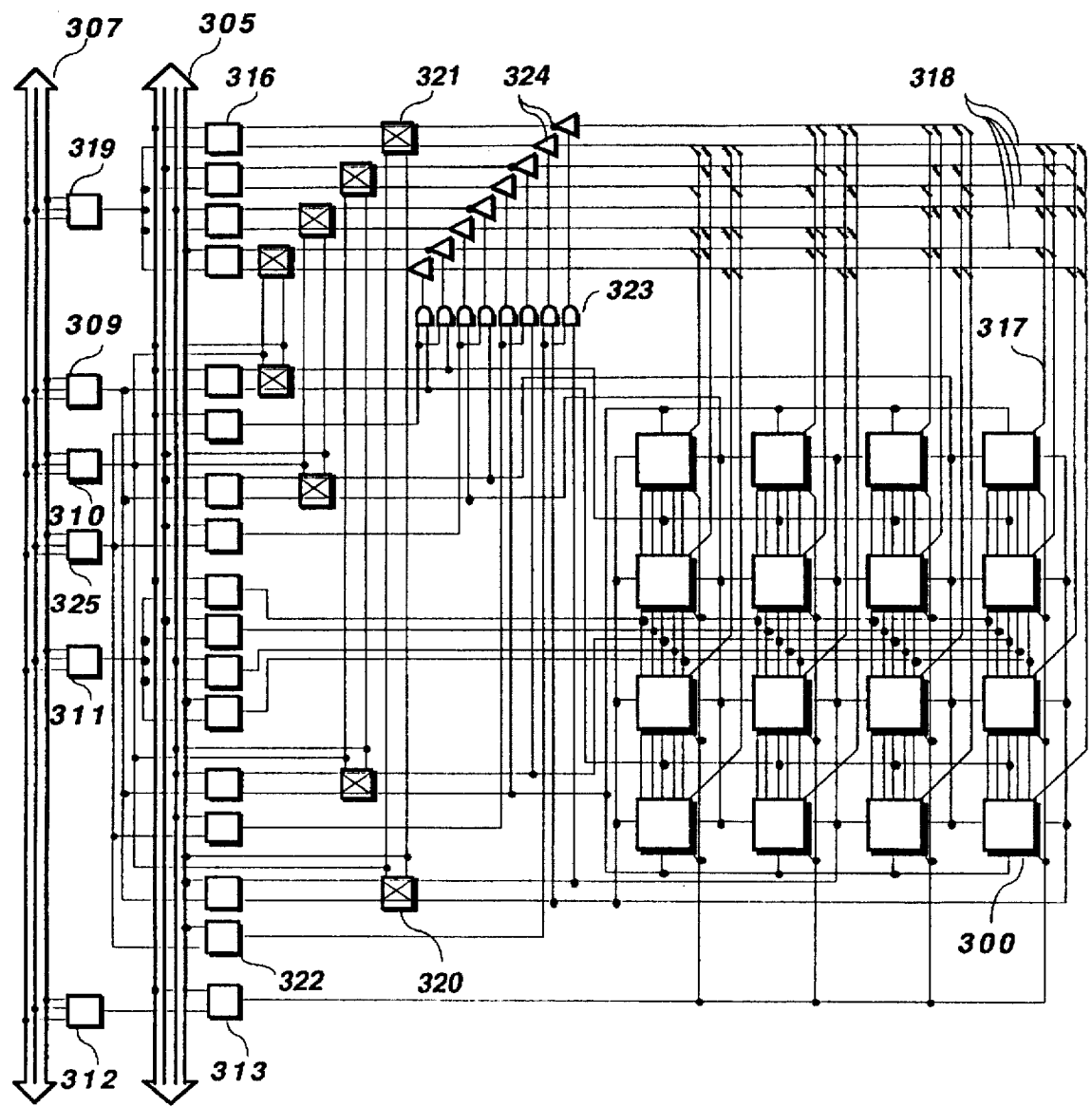

FIG. 3E is a table of control signals for operation of the interconnection network modules of FIGS. 3D and 3F. A first set of control signals 314 correspond to operational capabilities common to the interconnection network modules of FIGS. 3D and 3F. A second set of control signals 315 extends the operational capabilities of the interconnection network modules of FIG. 3F. The system network of FIG. 4, described below, illustrates procedural relationships between control signals 314, 315 of FIG. 3E for configuration and operation of the interconnection network module of FIG. 3F in accordance with the methods of the present invention.

FIG. 3F is an enhanced embodiment of the interconnection network module of FIG. 3D. A first enhancement of the interconnection network shown in FIG. 3F relates to output pattern control. Output pattern circuits 316 couple a first and second set of elements 300 to a data bus 305 by signal path means 317, 318. Each output pattern circuit 316 is enabled by an output pattern control circuit 319 which is further coupled to a control bus 307. A network configuration determined by controlling, using logical polarity input switches 320, the logical polarity of input patterns, has corresponding logical polarity states for output patterns, controlled by logical polarity output switches 321.

A second enhancement of the interconnection network module shown in FIG. 3F relates to input and output pattern relationships. Each of the four input circuits 301, 302, 303, 304 of FIG. 3A can be configured as a network input or a network output. The states of output pattern circuits 316 and the configuration of input circuits 301, 302, 303, 304 are determined by output configuration circuits 322 coupling a data bus 305 and output pattern circuits 316 via gated buffer control circuits 323, 324. Output configuration circuits 322 are enabled by an output configuration control circuit 325 which is further coupled to a control bus 307.

FIG. 3G is a logic diagram of an exemplary network element 300 of the network module of FIG. 3F. Four element selection inputs 331, 332, 333, 334 corresponding to signals received by input circuits 301, 302, 303, 304 are logically coupled to four selection level input circuits 308 in accordance with a method disclosed in the co-pending U.S. patent application entitled, POLYMORPHIC NETWORK METHOD AND APPARATUS referenced above, permitting a network element state to be set or reset by a network element set/reset input circuit 313 and subsequently output by signal path means 317 when enabled.

Figure 4:
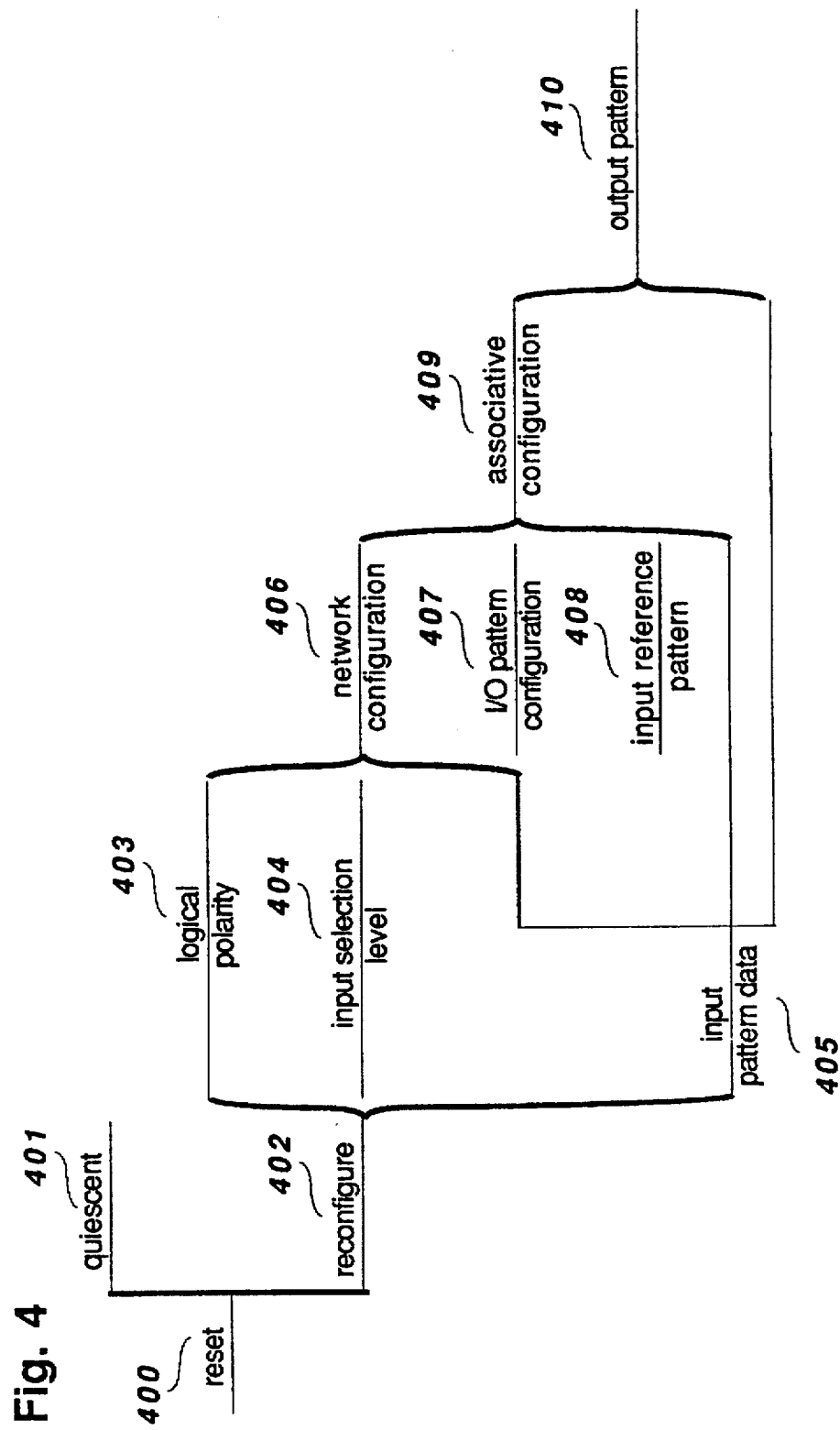
FIG. 4 is a system network diagram illustrating procedural relationships between control signals for configuration and operation of an interconnection network module in accordance with methods of the present invention.

FIG. 4 is a system network diagram illustrating procedural relationships between control signals 314, 315 for configuring and operating the interconnection network module of FIG. 3F as an associative recall processor in accordance with the methods of the present invention. On receiving a reset signal 400, the interconnection network module of FIG. 3F is returned to a known state and either remains quiescent 401 or is reconfigured 402 to a next state. A network module configuration 406 responsive to input pattern data 405 is determined by controlling the logical polarity 403 and the input selection level 404 in accordance with a method fully disclosed in the co-pending U.S. patent application entitled, POLYMORPHIC NETWORK METHOD AND APPARATUS referenced above. An associative configuration phase 409 for a particular network configuration 406 allows an output pattern 410 to be generated in response to an associated input pattern 405 by controlling an input/output pattern configuration 407 and an input reference pattern 408 in accordance with a method of the present invention.

The process of the present invention provides for the dynamic configuration, reconfiguration and operation of a polymorphic network for mapping a first set of codewords to a second set of codewords. The polymorphic network apparatus includes a plurality of input circuits, a data bus having a plurality of signal paths, and a control bus.

The process of mapping begins by configuring a plurality of elements arranged in a fixed, physical, network configuration for an logical N-dimensional configuration. The process continues by inputting a first polarity selection signal or a second polarity selection signal for each of the plurality of signal paths. The first polarity selection signal corresponds to reversing a logical polarity of a related input circuit and the second polarity control signal corresponds to restoring the logical polarity of the related input circuit. A control signal, corresponding to a polarity switch enable signal, is input on the control bus and transmitted through the plurality of signal paths to a plurality of polarity control switches. The process continues by inputting an output pattern configuration signal, corresponding to an input data pattern, on the data bus; and inputting a control signal, corresponding to an input output pattern configuration enable signal, on the control bus, with the plurality of signal paths accessed by a plurality of output pattern configuration circuits. A reference pattern signal, corresponding to an input pattern and an associated output pattern, may also be input on the data bus. The process continues by inputting a control signal, corresponding to an input pattern enable signal, on the control bus, and generating, in response to a particular input pattern of the first set of codewords, an output pattern of the second set of codewords.

Figure 5A:
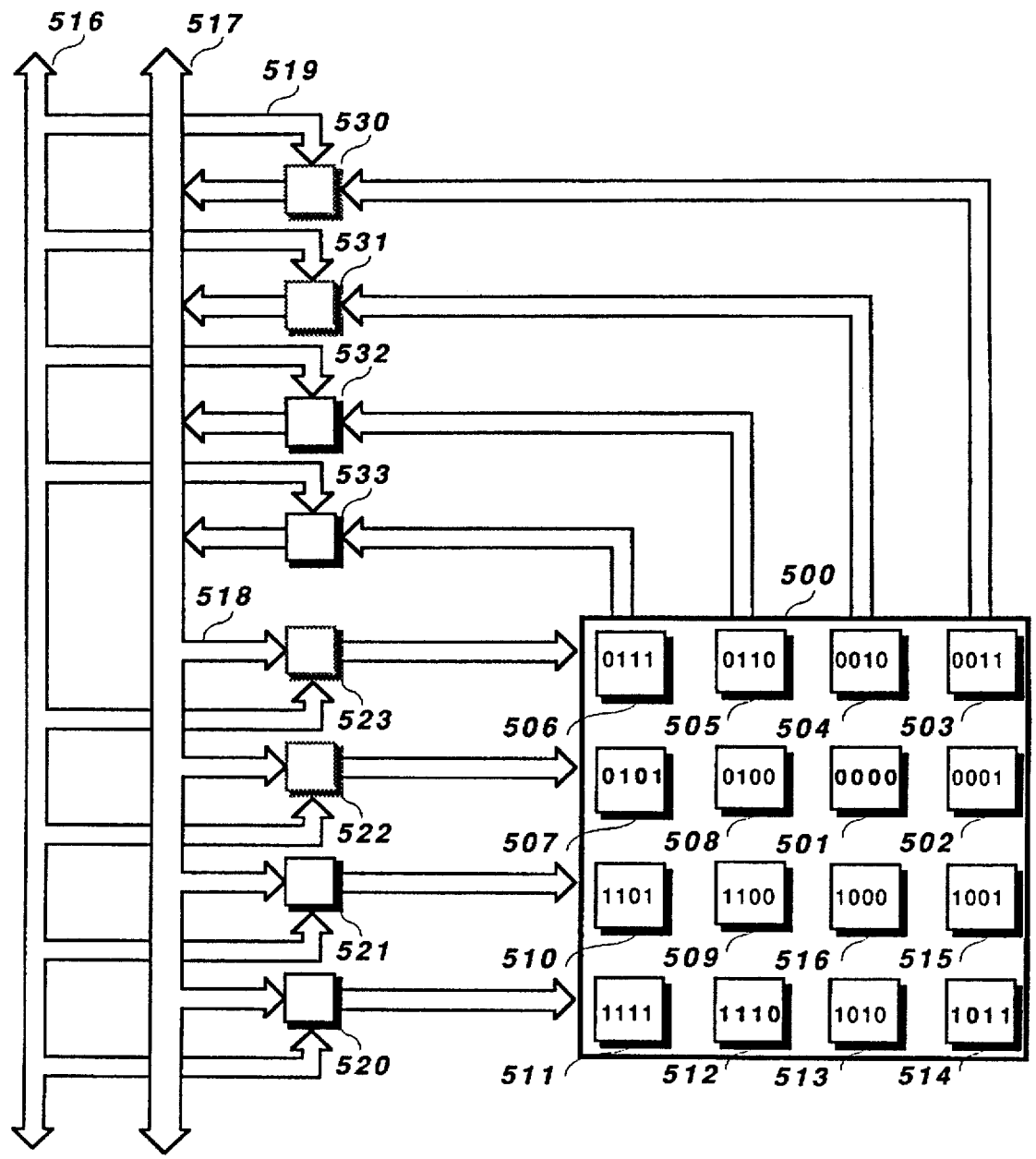
Figure 5C:
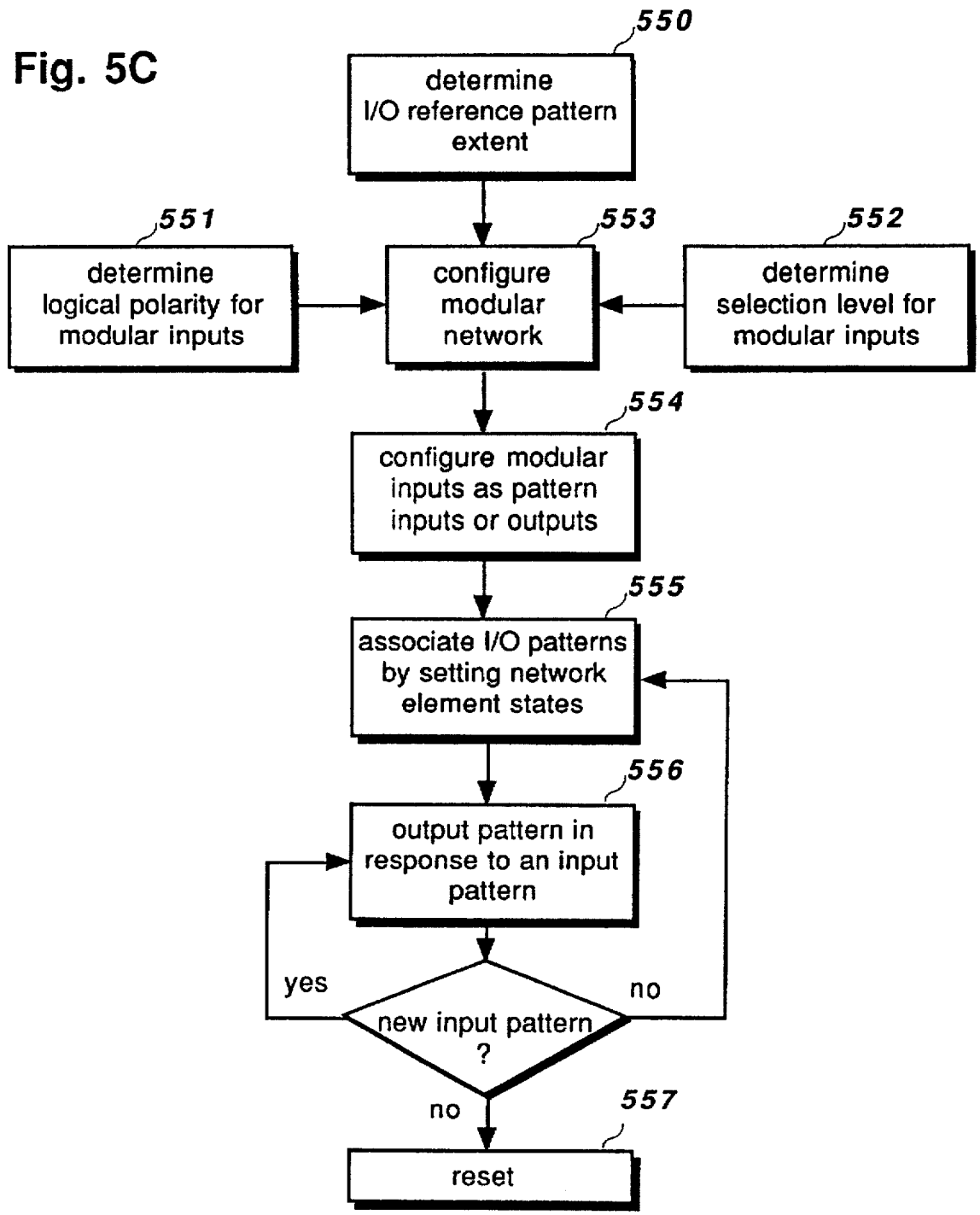

FIGS. 5A–5C illustrate a method of configuring and operating the preferred embodiment of a dynamically reconfigurable I/O processor module such as that set forth in FIG. 3F. FIG. 5A is a block diagram illustrating a simplified expression for the apparatus of FIG. 3F. Each element 501–516, coupled to modular input circuits 520–523 for an input pattern 405, may be selectively coupled to modular outputs 530–533 for an output pattern 410. Each element 501–516 is shown named with an input/output reference pattern 408 for a 16-element module 500 having a network configuration 406 wherein the logical polarity 403 for each modular input circuit 520–523 is clear and the input selection level 404 for each modular input circuit 20–523 is set.

When mapping a first set of codewords to a second set of codewords, a reflected binary output pattern is generated in response to a particular binary input pattern. The table of FIG. 5B shows a first set of binary terms 540 and a corresponding second set of reflected binary terms 541.

During a configuration phase of an associative network such as that depicted by the network module of FIG. 5A, input patterns 542, 544, 546, 548 of a first set of binary terms comprising binary input patterns (00,01,10,11) are concatenated with corresponding output patterns 543, 545, 547, 549 of a second set of binary terms comprising reflected binary or Gray output patterns (00,01,11,10), to form a plurality of input reference patterns 408 (0000,0101,1011, 1111) for determining the number of modular inputs needed. An input/output pattern configuration 407 determines which modular inputs are associated with the data bus 517 for a first set of binary terms comprising input signals, and further determines which modular inputs are associated with the data bus 517 for a second set of binary terms comprising output signals. Two modular inputs 520, 521 are configured to be responsive to a first set of binary input patterns 542, 544, 546, 548 (00,01,10,11), and two modular outputs 532, 533 are configured to be responsive to a second set of reflected binary output patterns 543, 545, 547, 549 (00,01, 11,10).

During an operational phase of a previously configured associative network, input patterns 542, 544, 546, 548 are formed from signals produced by one or a plurality of inputs on the data bus 517, activated by control signals 519 on the control bus 516. Selected input patterns 542, 544, 546, 548 are filtered from a set of possible input patterns by module elements 501–516 having logical names corresponding to an input portion of an input reference pattern 408 (0000,0101, 1011,1111). Output patterns 543,545, 547, 549 are obtained from module elements 501–516 having logical names corresponding to both input and output portions of the input reference pattern 408 (0000,0101,1011,1111) and are presented to the data bus 517 when activated by control signals 519 on the control bus 516.

FIG. 5C is a flow diagram illustrating a general method for configuring and operating a reconfigurable associative network in accordance with the present invention. As set forth in FIG. 5C, the method begins by determining 550 an I/O reference pattern extent, determining 551 a logical polarity for modular inputs, and determining 552 a selection level for those modular inputs 552. These determinations are used to configure 553 a modular network. The method then comprises the steps of configuring 554 modular inputs as pattern inputs or pattern outputs, and associating 555 I/O patterns by setting the states of network elements having logical names corresponding to each I/O reference pattern 555. An output pattern is then generated 556 in response to a previously associated input pattern and, if an additional I/O reference pattern is input, the step of associating 555 I/O patterns by setting the state of a network element having a logical name corresponding to the new I/O reference pattern is repeated. If the input pattern corresponds to a partial logical name previously associated with an output pattern, the step of generating 556 an output pattern in response to a previously associated input pattern is repeated until a reset control signal 557 is received.

The reconfigurable network of the present invention implements filters for input patterns and generates selective responses corresponding to wanted output patterns for a method of associative recall. Output patterns are not "stored" in network elements, but are generated by a network element "named" by a logical connection activated during the configuration phase. Network configuration, in accordance with the method of the invention, is the process of describing various topological orderings for relations between input signals and output signals. By contrast, a conventional associative memory is one in which an output pattern or word is found by specifying some, or all, of the stored contents of the pattern or word rather than its location. In such conventional associative memories, an output signal is a function of information stored in a first circuit, called an associative cell, and of the information stored in a second circuit, called a compare cell. By contrast, associative recall is accomplished in accordance with the present invention by a method of representing relationships between patterns, not by storing patterns in content-addressable locations.

Referring to FIG. 2A, in a chordal keyboard the association of key patterns 230 with symbol instances in a given symbol system 220 is an example of associative recall 212 and is described below as an illustrative embodiment of the invention.

ILLUSTRATIVE EMBODIMENT OF THE INVENTION

The adaptive chord keyboard system of the present invention is presented as an illustrative embodiment but is representative of an entire class of polymorphic systems which may rely on the integrated internal and external control methods and apparatus of the present invention.

In an illustrative embodiment of the present invention, a plurality of photonic key sensors having characteristics corresponding to the key-state transition control problem are actuated in a time sequence determined by their proximity to a common light source. As a result, varying intervals between sensor actuation of a plurality of keys may occur even though the plurality of keys may have been pressed simultaneously. An object of the invention, illustrated by this key-state transition control problem, is to sequence asynchronously formed messages in response to a plurality of logically-related input activations.

Referring to FIG. 2A, key pattern 230 recognition is a NEWMAN special case of associative recall 212, namely, a process in which key press combinations are classified and mapped to a set Of discrete key elements for a key layout 210 designed to reflect and accommodate a range of varying user capabilities and preferences. Before instances of a particular symbol system such as digits or letters (e.g., an output pattern) can be associated with key patterns (e.g., an input pattern), a method of adaptively configuring a key layout 210 compatible with user capabilities and preferences must be described.

A key layout 210 configuration determines a range of available key patterns 230 selected from the larger set of possible key patterns. The problem of interactively adapting a key layout 210 configuration to a particular user by means of an interactive presentation mechanism which corresponds to an adaptive, combinatorially articulated representation mechanism, is representative of a class of control systems characterized as having deterministic objectives of control, i.e., intentionality.

Referring to FIG. 2A, a range of key patterns 230 for a key layout 210 is determined in part by user capabilities and preferences. The method of the present invention includes a process for adaptively configuring a keyboard for particular user capabilities and preferences using the associative network apparatus of the present invention. As described herein the associative network apparatus of the present invention includes a data bus having a plurality of signal paths, a control bus, and a plurality of electrically-activated elements arranged in a fixed, physical, network configuration. Using this adaptable associative network apparatus, logical configurations may be reconfigured to accommodate specific user capabilities and preferences and, based on these user capabilities and preferences, determine a range of available key layout configurations.

The process for adaptively reconfiguring a keyboard begins by configuring the plurality of electrically-activated elements for a mixed resolution, N-dimensional logical configuration. The process continues by inputting on the data bus an output pattern configuration signal, corresponding to an input data pattern, representing a plurality of operational states. A control signal, corresponding to an input/output pattern configuration enable signal, is input on the control bus, with the plurality of signal paths accessed by a plurality of output pattern configuration circuits. A first reference pattern signal, corresponding to an input pattern, is then input on the data bus representing a first set of user preferences and capabilities and an associated output pattern representing one of a plurality of operational states. The process continues by inputting a control signal, corresponding to an input pattern enable signal, on the control bus with the plurality of signal paths accessed by the plurality of input circuits. A next reference pattern signal, corresponding to an input pattern, is then input on the data bus representing a next set of user preferences and capabilities and an associated output pattern representing one of a plurality of operational states. A control signal, corresponding to an input pattern enable signal, is then input on the control bus with the plurality of signal paths accessed by the plurality of input circuits. The steps of inputting reference pattern signals are repeated until an association between all reference patterns for user preferences and capabilities and associated respective output patterns have been configured.

Figure 6A:
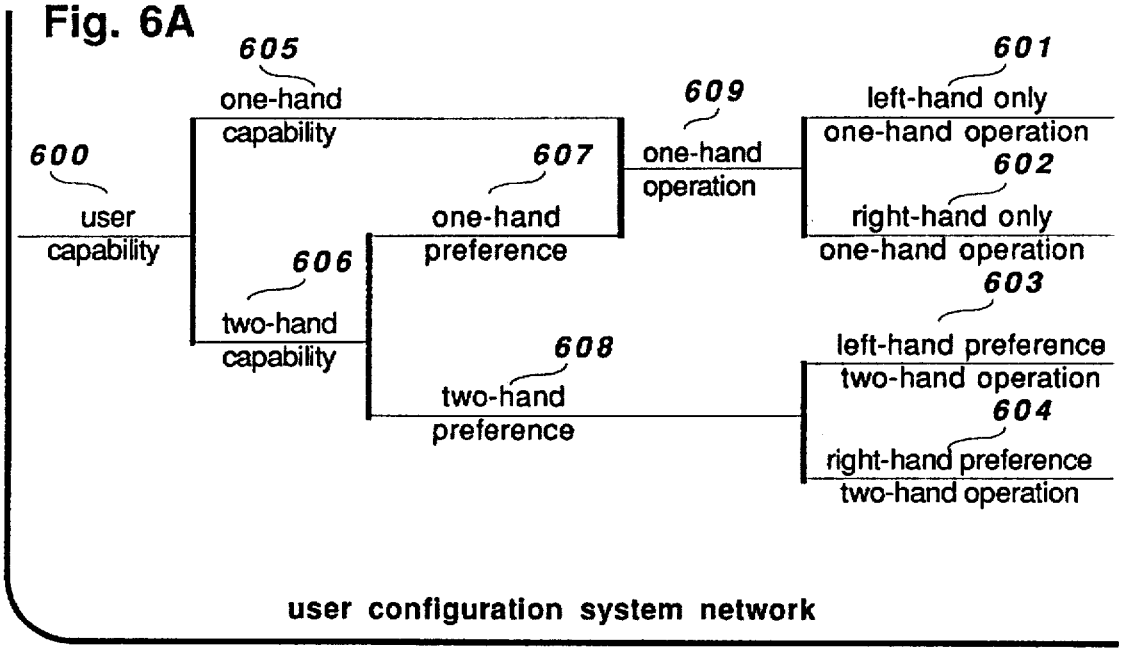

FIGS. 6A–6D show four different expressions of a process for specifying user capabilities and preferences in an adaptive chordal keyboard system. A first expression, shown in FIG. 6A, is a system network diagraming user capabilities and preferences in relation to handedness. The choice system 600 of FIG. 6A distinguishes between a one-hand capability 605 and a two-hand capability 606. If a user is capable of two-handed operation, a second choice system 606 determines a one-hand 607 or a two-hand 608 operational preference. Either a one-hand capability 605 or a one-hand preference 607 results in a one-hand operation 609. Once a one-hand or two-hand operational configuration has been determined, left or right hand capability or preference establish one of four operational configurations 601, 602, 603, 604. As shown, the four resultant operational configurations of a chordal keyboard system comprise a first configuration 601 permitting left hand only operation, a second configuration 602 allowing right hand only operation, a third configuration 603 permitting two hand operation with a left hand preference, and a fourth configuration 604 allowing two hand operation with a right hand preference. Although the system network of FIG. 6A is a high-level expression of user configuration concepts, there is a logical correspondence to the functional expression of FIG. 6B.

Figure 6B:
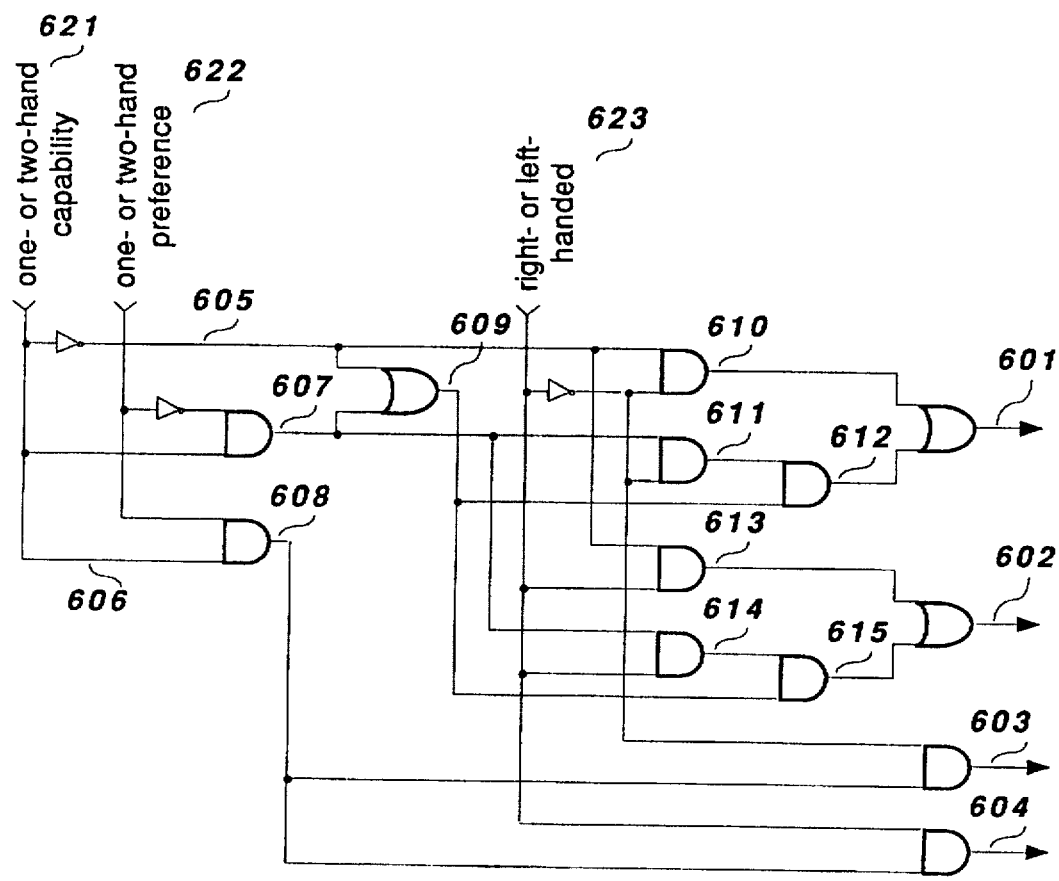

The combinational logic diagram of FIG. 6B illustrates relationships between three inputs 621, 622, 623 and one of four operational configurations 601, 602, 603, 604 as outputs. A first input 621, corresponding to choice system 600 of FIG. 6A, distinguishes between a one-hand capability 605 and a two-hand capability 606. Inputs 621 and 622 of FIG. 6B and their complements are summed at gates 607 and 608, corresponding to the one-hand 607 or two-hand 608 operational configuration of FIG. 6A. The output of gate 609 of FIG. 6B is the product of gate 607 of FIG. 6B and the complement of input 621 corresponding to the one-hand operation 609 of FIG. 6A. The outputs of gates 610–615 of FIG. 6B describe intermediate states not explicitly represented in the conceptual diagram of FIG. 6A.

The mixed-resolution, four-dimensional object space of FIG. 6C shows a third expression of a process for specifying user capabilities and preferences in an adaptive chordal keyboard system, in accordance with the method disclosed in U.S. Pat. No. 5,301,284 entitled MIXED-RESOLUTION, N-DIMENSIONAL OBJECT SPACE METHOD AND APPARATUS, referenced above. Three binary dimensions 621, 622, 623 of FIG. 6C correspond to three inputs 621, 622, 623 of FIG. 6B. A fourth dimension 624 of FIG. 6C, having two-levels of resolution, corresponds to the four operational configurations 601, 602, 603, 604 also shown in FIGS. 6A and 6B. Elements 625 and 626 of FIG. 6C correspond to intermediate states 610 and 612 of FIG. 6B, which result in the first output configuration 601 permitting left hand only operation. Elements 627 and 628 of FIG. 6C correspond to intermediate states 613 and 615 of FIG. 6B, which result in the second output configuration 602 allowing right hand only operation. Element 629 of FIG. 6C corresponds to the third output configuration 604 permitting two hand operation with a right hand preference. Finally, element 630 of FIG. 6C corresponds to the fourth output configuration 603 allowing two hand operation with a left hand preference.

The 5-bit symbolic names associated with elements 625–630 of FIG. 6C uniquely identify a relation between a set of inputs and an output state. Element 625 of FIG. 6C, for example, having a symbolic name "00111," when read from the right, comprises a first, second, and third bit represented by logical ones for each of the corresponding inputs 621, 622, 623, and further comprises a fourth and fifth bit represented by logical zeros for the output configuration 601 permitting left hand only operation. Noting the first dimension 621 of FIG. 6C, the distinction between elements 625 and 626 of FIG. 6C and intermediate states 610 and 612 of FIG. 6B is described as a one-hand operational preference and a one-hand operational capability, a distinction implied in the network diagram of FIG. 6A, but not explicitly named. The expression of FIG. 6C for specifying user capabilities and preferences for configuring an adaptive chord keyboard system further corresponds to a method of operating a reconfigurable, associative network apparatus of the present invention.

Figure 6D:
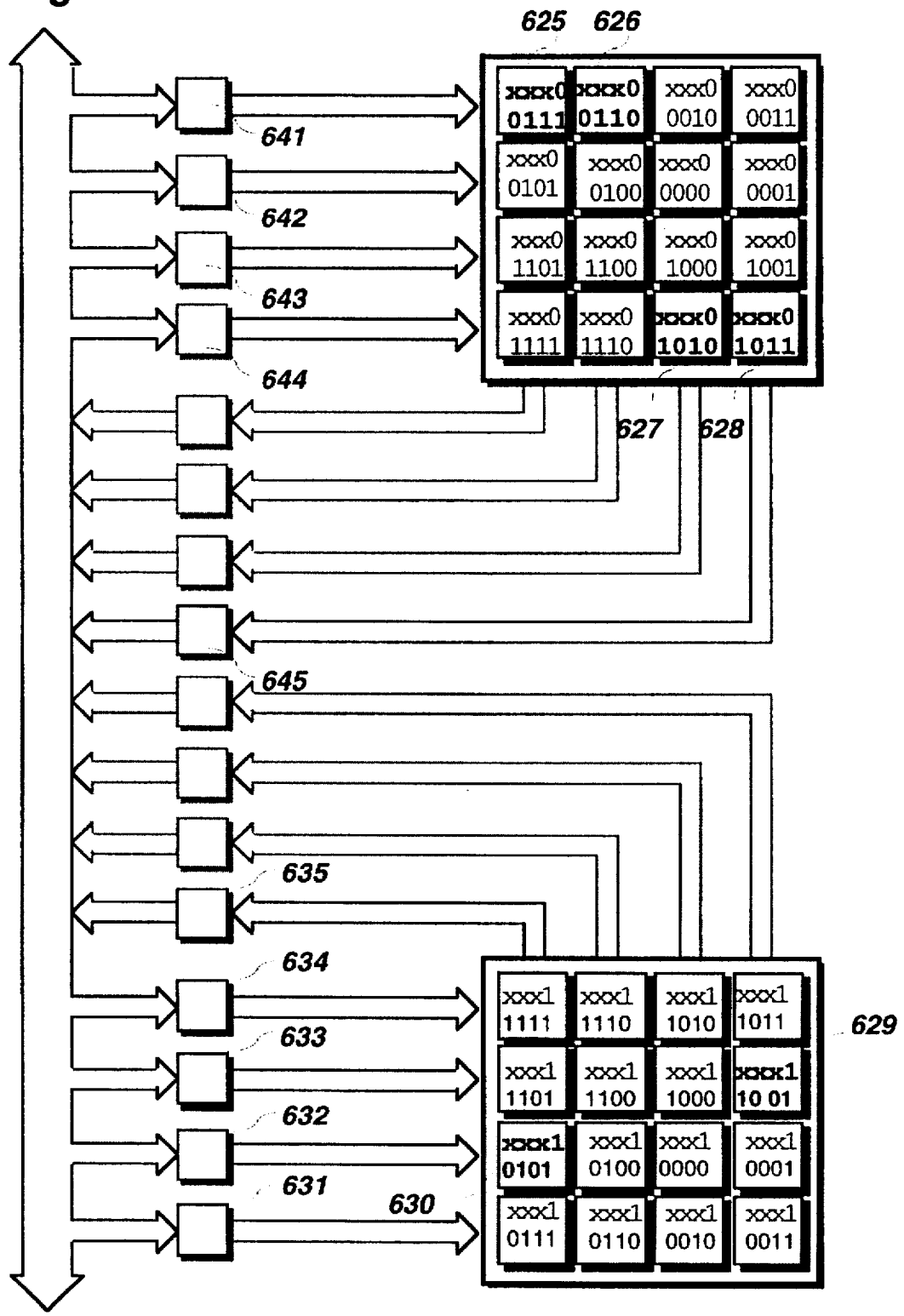

FIG. 6D is a block diagram illustrating a simplified expression of a two-module version of the apparatus of FIG. 3F. Each element of FIG. 6D is coupled to modular inputs 631–634, 641–644 for an input pattern and may be selectively coupled to modular outputs 635, 645 for an output pattern. Each element 625–630 is shown named with an eight-bit input/output reference pattern. The three left-most bits, named "xxx," are for module allocation in accordance with a method fully disclosed in the co-pending U.S. patent application entitled, POLYMORPHIC NETWORK METHOD AND APPARATUS referenced above. The five right-most bits correspond to symbolic names associated with elements 625–630 of FIG. 6C, described above as uniquely identifying a relation between a set of inputs and an output state. The correspondence between the conceptual expression of FIG. 6A, the logical expression of FIG. 6B and the functional expression of FIG. 6D suggests a continuity between the machine level and all structures built up from it. This continuity is achievable in "problem-oriented machines" through satisfaction of the "principle of homogeneity, according to which a module and a higher unit cannot be distinguished by any of the conventions for dealing with them." The principle of homogeneity requires a correspondence between what is to be represented in a machine (external view) and the corresponding form in the machine (internal view). Ideally, the principle of homogeneity suggests a further correspondence between the internal representation and the corresponding presentation of the machine. The present invention demonstrates continuity between the machine level and all structures built up from this level in a manner not taught by the prior art.

Figure 7D:
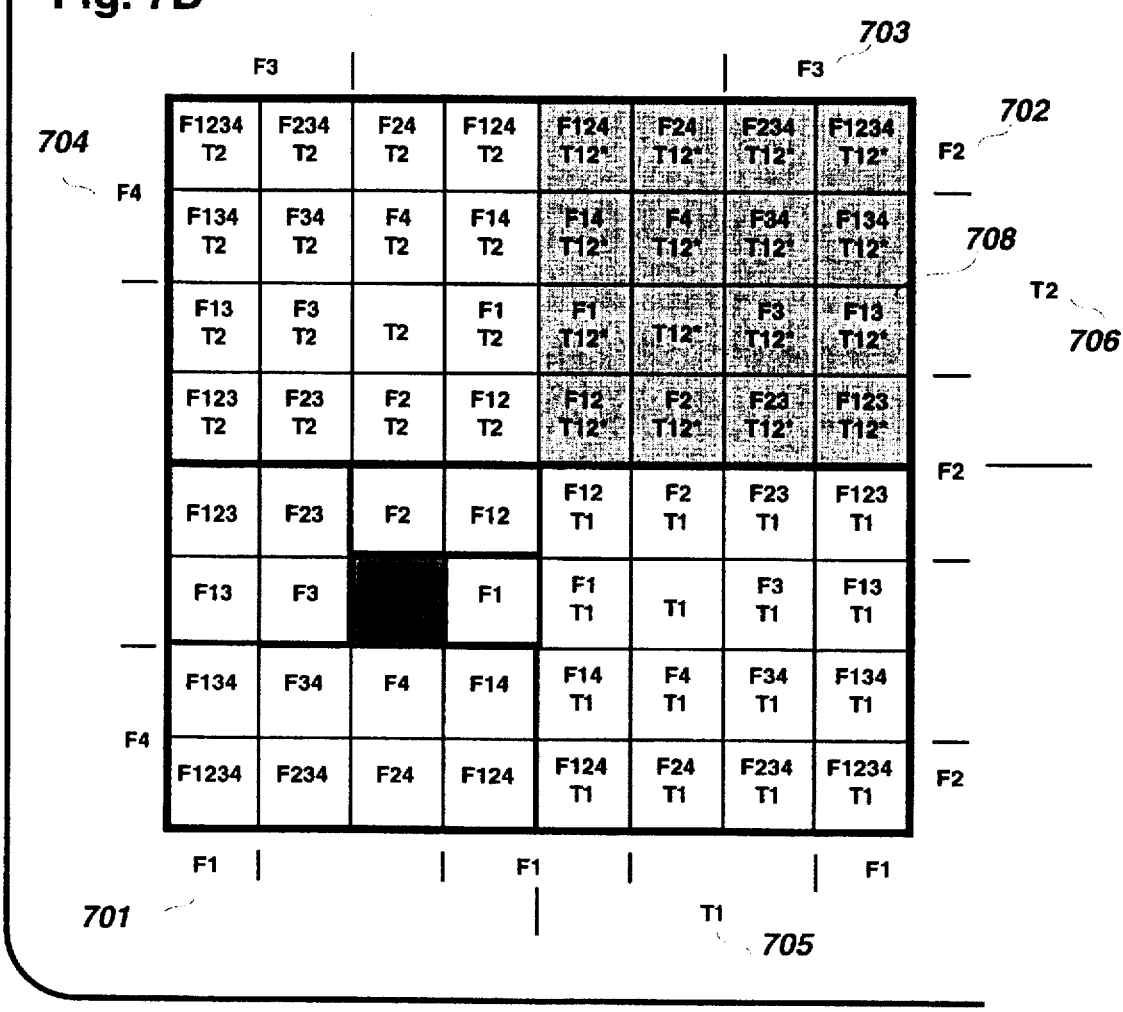

FIGS. 7A–7D illustrate an exemplary key layout for further specifying user capabilities while interactively configuring an adaptive chordal keyboard system. FIGS. 7A and 7B show two expressions of an 11-key layout. FIG. 7B names the key symbols of FIG. 7A. Keys associated with the four fingers of the left hand are named "L1" through "L4"; keys associated with the four fingers of the right hand are named "R1" through "R4." Keys associated with the thumbs of each hand are named "LT1" and "RT1", respectively. A common key which can be pressed by a thumb from either hand is named "LT2/RT2".

FIG. 7C shows two instances of a binary, six-dimensional object space illustrating a third key layout expression for further specifying user capabilities in an adaptive chordal keyboard system, in accordance with the method disclosed in U.S. Pat. No. 5,301,284 entitled MIXED-RESOLUTION, N-DIMENSIONAL OBJECT SPACE METHOD AND APPARATUS, referenced above. A first object space 707 is associated with the fingers and thumb of the left hand. A second object space 708 is associated with the fingers and thumb of the right hand. Five binary dimensions 701–705 of FIG. 7C correspond with keys associated with the four fingers and thumb of a hand. A sixth binary dimension 706 corresponds to a common key which can be pressed by a thumb from either hand, named "LT2/RT2" in FIG. 7B.

The names of all possible combinations of key patterns that can be formed with a single hand having full capability are shown associated with their spatial locations in the object space of FIG. 7D. All elements in this region include key patterns formed using thumb key "T1" 705 and thumb key "T2" 706. Keys "T1" and "T2" can only be pressed simultaneously with the thumbs of opposite hands. The key patterns of FIG. 7D apply to both right and left hands; however, when a key pattern includes "T2" 706 for one hand, no key pattern using "T2" for the other hand can be activated. Accordingly, an element named "F13T12*" 708 of FIG. 7D is shown in a region of the object space that is drawn with a shaded background pattern, indicating that element may not be activated.

The method of the present invention includes a process for adaptively configuring a keyboard for particular user capabilities, limitations and preferences using the associative network apparatus of the present invention. Using the associative network apparatus of the present invention, including a data bus having a plurality of signal paths, a control bus, and a plurality of electrically-activated elements arranged in a fixed, physical, network configuration, a particular user's capabilities and preferences for operating a keyboard may form the basis for determining a range of available key input patterns for a particular key layout configuration. This key layout configuration may be easily adapted to configure a keyboard customized in operation for a user having capabilities and preferences relating to the digits of just one hand.

The method of configuring a keyboard for use with the digits of just one hand begins by configuring the plurality of elements for a logical N-dimensional configuration with each dimension corresponding to a two-state key activation associated with a particular digit of one hand. The method continues by inputting on the data bus an input pattern signal corresponding to an input data pattern representing a particular user's ability to press and release a combination of keys for an input key pattern. A control signal, corresponding to an input data pattern enable signal, is input such that the plurality of signal paths are accessed by a plurality of input pattern configuration circuits.

The method continues by inputting, on the data bus, an output pattern configuration signal corresponding to the input data pattern representing a response to a plurality of possible key activations for an input key pattern. A control signal, corresponding to an input/output pattern configuration enable signal, is input on the control bus, with the plurality of signal paths accessed by a plurality of output pattern configuration circuits. The method continues by inputting, on the data bus, a first reference pattern signal corresponding to an input pattern representing a first combination of keys for an input key pattern. A control signal, corresponding to an input pattern enable signal, is input on the control bus, with the plurality of signal paths accessed by a plurality of input circuits. A next reference pattern signal corresponding to an input pattern representing a next combination of keys for an input key pattern is then input on the data bus, and a control signal, corresponding to an input pattern enable signal, is input on the control bus, with the plurality of signal paths accessed by a plurality of input circuits. The steps of inputting reference pattern signals are repeated until an association between all reference patterns for user preferences and capabilities and associated respective output patterns have been configured.

The method just set forth may further comprise repeating the sequence of steps for adaptively configuring key patterns representing input and output pattern associations corresponding to input patterns formed by key activations of a second hand. Particular key patterns of a first hand form input patterns associated with output patterns corresponding to a first component of a structured symbol name. Particular key patterns of a second hand form input patterns associated with output patterns corresponding to a second component of a structured symbol name. The first and second components of the structured symbol name may further correspond to particular symbol set instances of a symbol system. The method may further comprise the steps of inputting a control signal, corresponding to an input data pattern enable signal, on the control bus with the plurality of signal paths accessed by a plurality of input pattern configuration circuits, and determining output patterns corresponding to the first and second components of the structured symbol name for particular symbol set instances of a symbol system.

Referring to FIG. 2A, a method of associative recall 212 for a key layout 210 is determined in part by instances of a symbol system 220 associated with a range of possible key patterns 230.

Figure 8B:
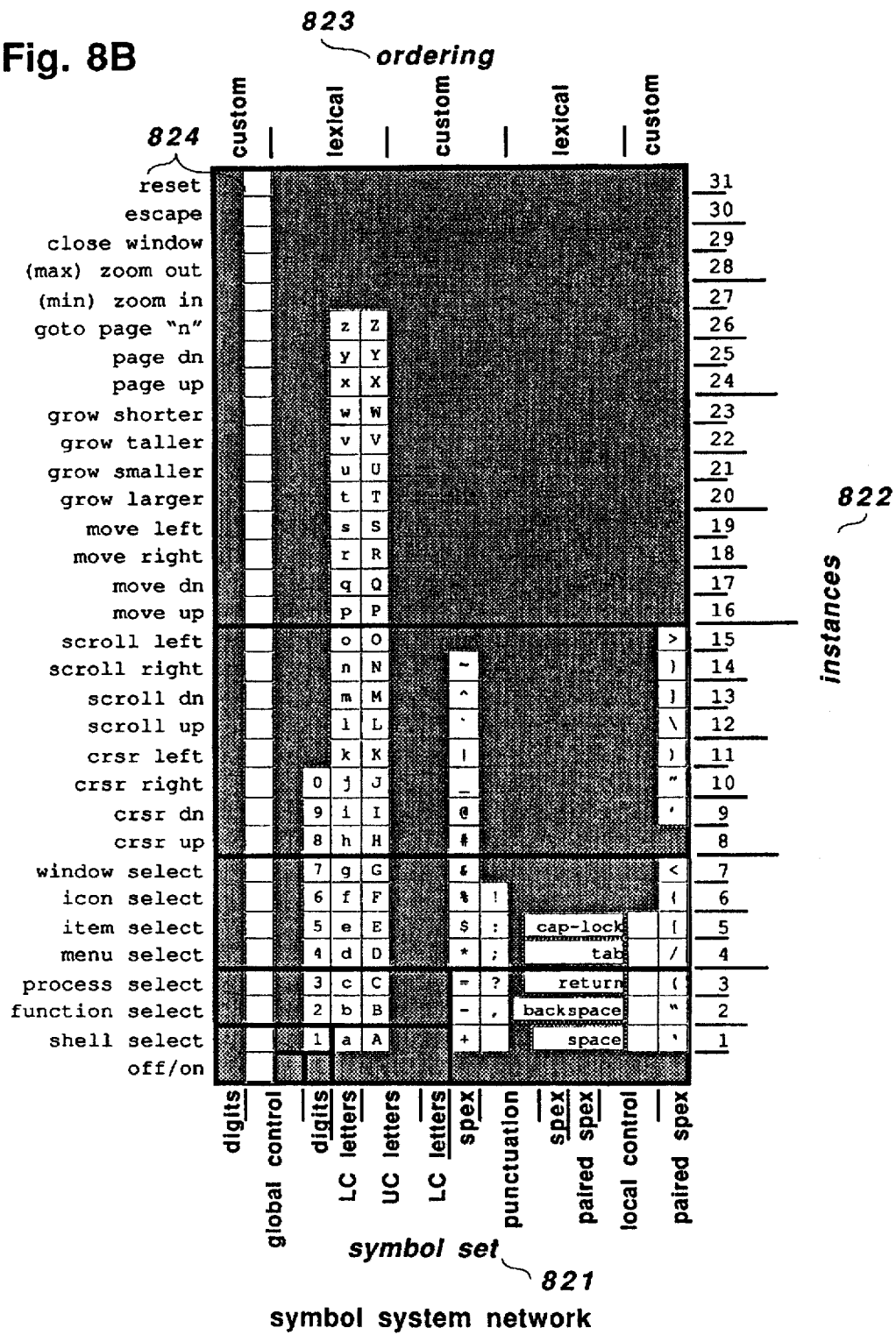

FIGS. 8A and 8B show a method of specifying a symbol system for configuring an adaptive chordal keyboard system. FIG. 8A is a system network which describes symbol sets for an English language symbol system 800. A symbol set choice system in the symbol set choice system 809 comprises eight symbol sets 801–808. Each symbol set in the symbol set choice system 809 is further described by a custom 813 or lexical 814 ordering 810 of its instances 811, and a pattern 812 of cycles 815 and cycle extents 816. Symbol set cycles 815 and cycle extents 816, described below in relation to FIGS. 9A–9H, are methods for associating key patterns with symbol set instances 811.

FIG. 8B shows a mixed-resolution, three-dimensional object space illustrating ordered sets of symbol set instances for a symbol system configuration in an adaptive chordal keyboard system, in accordance with the method disclosed in U.S. Pat. No. 5,301,284 entitled MIXED-RESOLUTION, N-DIMENSIONAL OBJECT SPACE METHOD AND APPARATUS, referenced above. A first dimension 821 corresponds to symbol sets 801–808 of FIG. 8A. A second dimension 822 enumerates instances of each symbol set 821. A third dimension 823 associates each symbol set 821 with either a lexical ordering or a custom ordering of its instances 822. A set of instances 824 listing global control operations is an example of a custom ordered 823 symbol set 821.

Figure 9A:
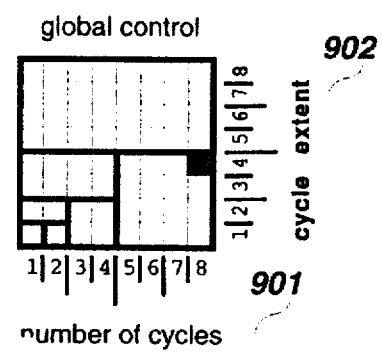
FIGS. 9A–9H are object spaces which illustrate a number of key pattern cycles and key pattern extents for symbol sets in a symbol system.
Figure 9B:
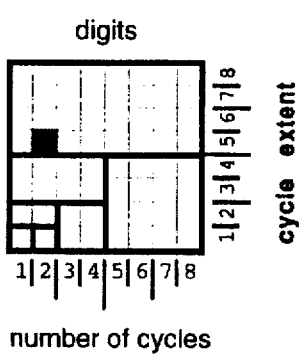
Figure 9C:
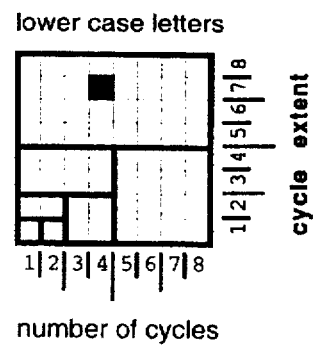
Figure 9D:
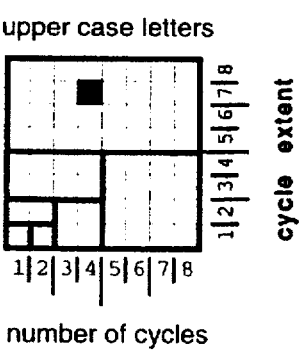
Figure 9E:
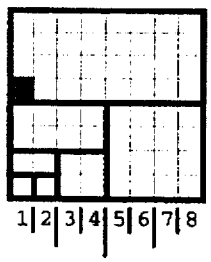
Figure 9F:
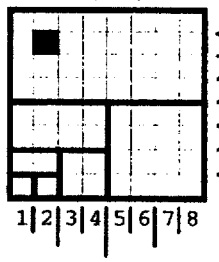
Figure 9G:
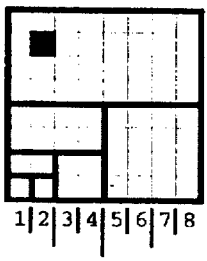
Figure 9H:
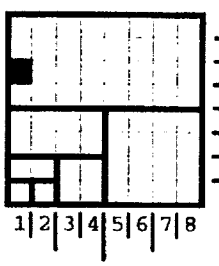

FIGS. 9A–9H are two-dimensional object spaces with each dimension 901, 902 having three levels of resolution illustrating a number of key pattern cycles 901 and key pattern extents 902 for symbol sets in a symbol system. Key pattern cycles 901 and key pattern extents 902 of FIG. 9A are methods for associating key patterns with symbol set instances. The idea is to logically structure key patterns by having a small number of simple patterns formed by a dominant hand or dominant digits of a hand repeat or "cycle" within a symbol set, where the number of patterns in a cycle 901 determines a cycle extent 902. A small number of cycle patterns formed with the less dominant hand or digits of a hand distinguish each cycle of repeated patterns within a symbol set and classify symbol set instances within a symbol system. FIGS. 9C and 9D, for example, describe a cycle and extent configuration for sets of twenty-six lower and upper case letters in an English symbol system. Three cycles having up to a seven pattern extent are described in FIGS. 9C and 9D, providing up to twenty-eight possible symbol set instances—two more than necessary for a third cycle. Cycle and extent configuration for each symbol set in a symbol system is a design problem coordinated with key pattern and symbol instance association methods described below in relation to FIGS. 10A–10H.

Figure 10A:
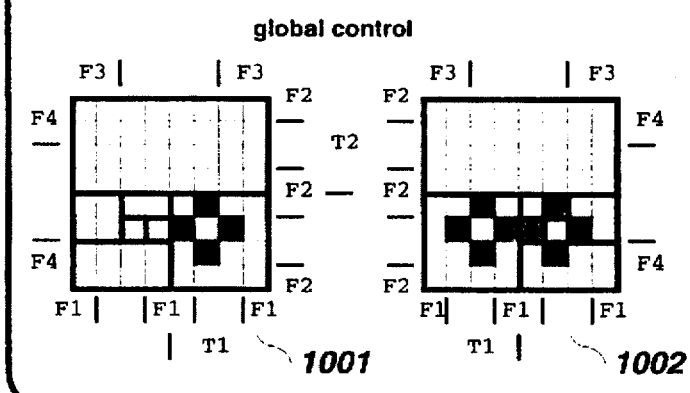
FIGS. 10A–10H are object spaces which show particular key patterns as input patterns associated with instances of symbol sets of a symbol system as output patterns comprising an associative recall network in an adaptive chordal keyboard system.
Figure 10B:
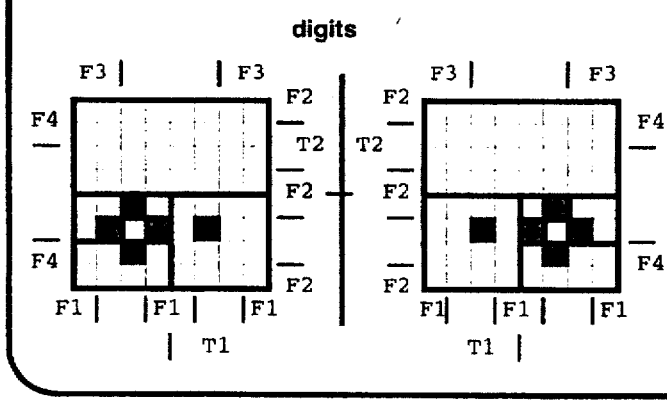
Figure 10C:
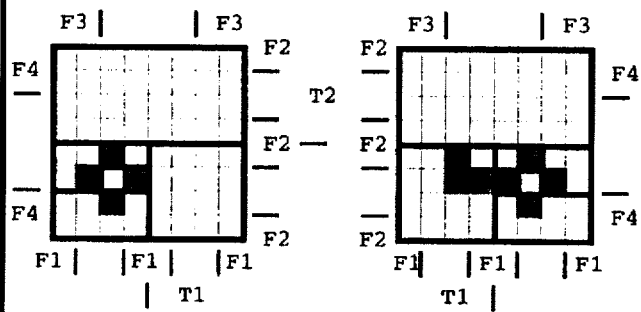
Figure 10D:
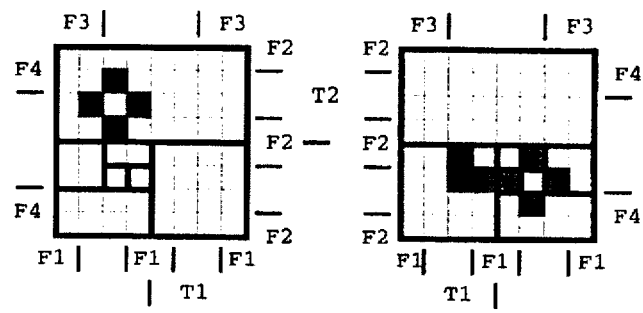
Figure 10E:
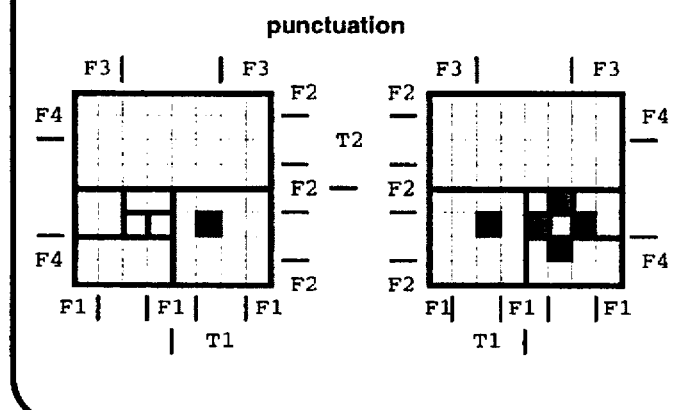
Figure 10F:
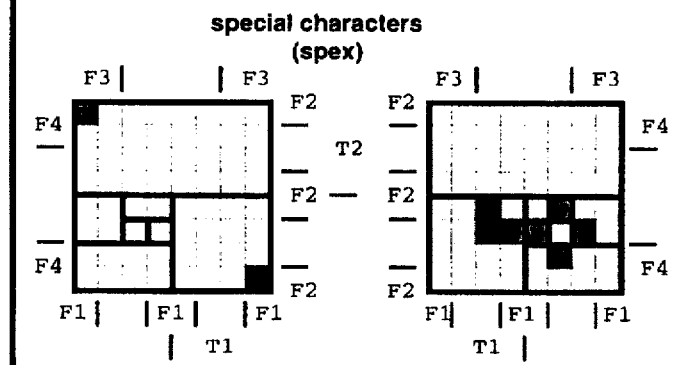
Figure 10G:
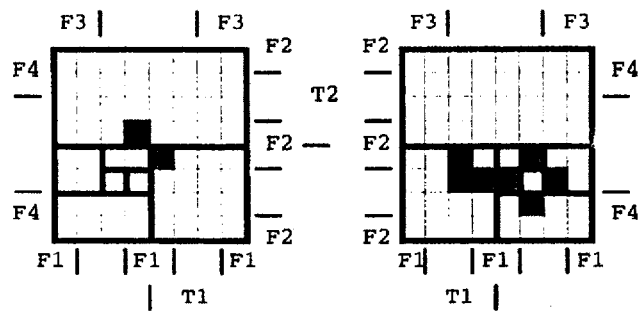
Figure 10H:
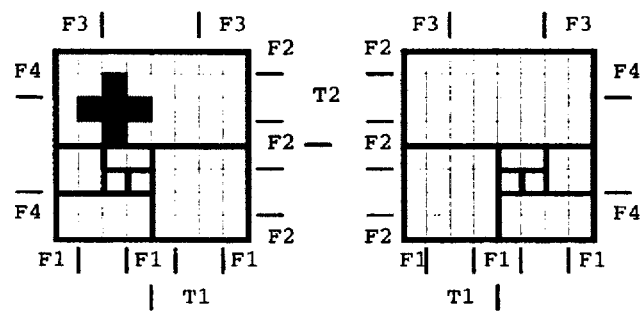

FIGS. 10A–10H are object spaces which show particular key patterns as input patterns associated with instances of symbol sets as output patterns comprising an associative recall network in an adaptive chordal keyboard system. A first object space 1001 of FIGS. 10A–10H is associated with the fingers and thumb of the left hand. A second object space 1002 of FIGS. 10A–10H is associated with the fingers and thumb of the right hand. Each first and second object space 1001, 1002 of FIGS. 10A–10H correspond to object spaces of FIG. 7C described above. The key pattern and symbol instance associations of FIGS. 10A–10H assume full capability, two-hand operation, and a right-hand preference. FIG. 9B, for example, associates the sequence RF1, RF2, RF3, RF4, RT1, with digits 1, 2, 3, 4, and 5, respectively. FIG. 9B further associates the sequence LF1, LF2, LF3, LF4, LT1, with digits 6, 7, 8, 9, and 0, respectively. A lower case letter symbol set is associated with key patterns in FIG. 10C that use the sequence LF1, LF2, LF3, and LF4 for four cycles of seven patterns forming the sequence RF1, RF2, RF3, RF4, RT1/RF1, RT1/RF2, and RT1/RF3. The difference between the lower case letter patterns of FIG. 10C and the upper case letter patterns of FIG. 10D is the key LT2 added to each of the left-hand cycle keys, i.e., LT2/LF1, LT2/LF2, LT2/LF3, and LT2/LF4. The design objectives, when associating available key patterns with symbol set instances, include specifying a small number of patterns used in logical combinations and ordered in a manner consistent with the ordering of symbol set instances.

The object spaces of FIGS. 10A–10H describe input key patterns which can be associated with output symbol instances for configuring an associative recall apparatus of the present invention in a manner corresponding to user capabilities and preferences as described above in relation to FIGS. 6C and 6D. A structured symbol system with symbols having a first component corresponding to a particular symbol set and a second component naming an instance of that symbol set is an example of a modular implementation strategy in accordance with the present invention. A first object space 1001 of FIGS. 10A–10H, naming input patterns associated with the fingers and thumb of the left hand, can be further associated with output patterns corresponding to a first component of a structured symbol name corresponding to symbol set identifiers. A second object space 1002 of FIGS. 10A–10H, associated with the fingers and thumb of the right hand, can be further associated with output patterns corresponding to a second component of a structured symbol name corresponding to symbol set instances. The method and apparatus of the present invention support adaptive reconfigurability for a plurality of user capabilities and preferences including physical operation, task-oriented symbol set associations, and language-specific symbol set associations.

The method of the present invention may further include a process for adaptively configuring a plurality of logically-related input activations to permit any number of actuator means, including all actuator means, to be activated and deactivated simultaneously or sequentially in any sequence. Such configuration may be used to control asynchronously formed message transitions in response to a plurality of logically-related input activations. The method begins by configuring a plurality of elements arranged in a fixed, physical, network configuration for a logical N-dimensional configuration with each dimension corresponding to a two-state key activation. An output pattern configuration signal, corresponding to an input data pattern, is input on a data bus representing a response to a plurality of possible key activations for an input key pattern. A control signal, corresponding to an input output pattern configuration enable signal, is input on a control bus with a plurality of signal paths within the data bus accessed by a plurality of output pattern configuration circuits. The method continues by inputting a first reference pattern signal, corresponding to an input pattern, on the data bus representing a first combination of keys for an input key pattern. A control signal, corresponding to an input pattern enable signal, is input on the control bus with the plurality of signal paths accessed by a plurality of input circuits. The method continues by inputting a next reference pattern signal, corresponding to an input pattern, on the data bus representing a next combination of keys for an input key pattern. A control signal, corresponding to an input pattern enable signal, is input on the control bus with the plurality of signal paths accessed by a plurality of input circuits. The steps of inputting reference pattern signals are repeated until an association between all reference patterns for all possible combinations of keys for input key patterns and respective output patterns have been configured.

Figure 11A:
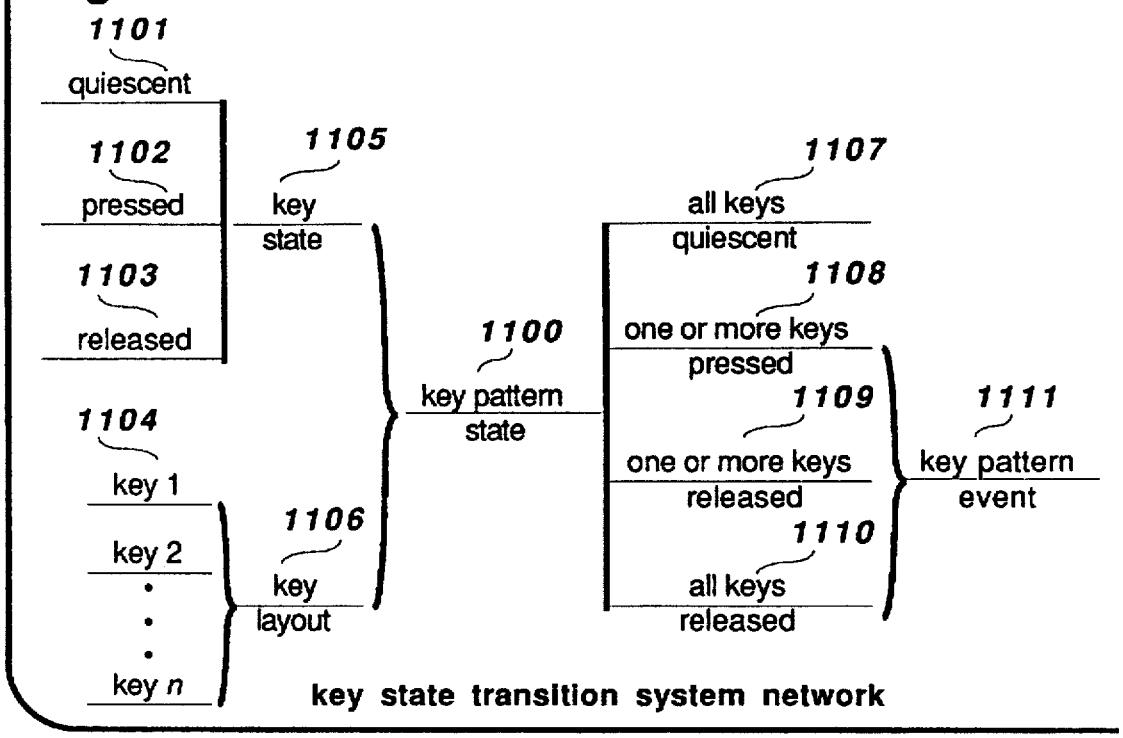

FIGS. 11A and 11b are system network diagrams illustrating the key-state transition control problem as a sequence of asynchronously formed messages generated in response to a plurality of logically-related input activations. FIG. 11A illustrates the transition control method disclosed in U.S. Pat. No. 5,189,416, "CHORDAL KEYBOARD METHOD AND APPARATUS," referenced above, wherein the disclosed method permits any number of keys 1104, including all keys 1106, to be depressed 1108 and released 1109 simultaneously or sequentially in any sequence, while generating a key pattern event 1111 only when all keys have been released 1110. FIG. 11B illustrates an alternative method of transition control by permitting both an input key pattern 1111 and an associated output pattern or symbol 1117 to be decomposed into component patterns 1113–1116. The number of unwanted states may be reduced exponentially by subdividing the problems of pattern recognition and pattern association, e.g., $2^{11}$: $(2^6+2^6)$.

The method of the present invention may also include a process for adaptively configuring a keyboard for a particular symbol system. The process begins by configuring a plurality of elements arranged in a fixed, physical, network configuration for a mixed-resolution, N-dimensional logical configuration with each dimension corresponding to at least one key pattern. An output pattern configuration signal is input on a data bus corresponding to an input data pattern representing a response to a plurality of possible key activations for an input key pattern. A control signal is input on a control bus corresponding to an input/output pattern configuration enable signal, with signal paths of the data bus accessed by a plurality of output pattern configuration circuits. The process continues by inputting a first reference pattern signal on the data bus corresponding to an input pattern representing a first combination of keys for an input key pattern associated with an instance of a plurality of symbols in the symbol system. A control signal is input on said control bus corresponding to an input pattern enable signal, with the signal paths of the data bus accessed by a plurality of input circuits. A next reference pattern signal is input on the data bus corresponding to an input pattern representing a next combination of keys for an input key pattern associated with an instance of a plurality of symbols in the symbol system. A control signal is input on the control bus corresponding to an input pattern enable signal, with the signal paths of the data bus accessed by a plurality of input circuits. The method steps of inputting reference pattern signals and control signals may be repeated until an association between all reference patterns for all possible combination of keys for input key patterns and respective output patterns has been configured.

FIGS. 12A–12I show a mixed-resolution, five-dimensional object space illustrating symbol instances associated with key patterns for a symbol system configuration in an adaptive chordal keyboard system, in accordance with the method disclosed in U.S. Pat. No. 5,301,284 entitled MIXED-RESOLUTION, N-DIMENSIONAL OBJECT SPACE METHOD AND APPARATUS, referenced above. A first dimension 1201 of FIG. 12A corresponds to a first thumb key for the left hand named "LT1." A second dimension 1202 of FIG. 12A corresponds to a second thumb key for either the left or right hand named "T2." A third dimension 1203–1206 of FIG. 12A corresponds to finger keys for the left hand named "LF1" through "LF4" and two key combinations 1207, 1208 named "LF12" and "LF1234." A fourth dimension 1209–1212 of FIG. 12A corresponds to finger keys for the right hand named "RF1" through "RF4." A fifth dimension 1213 of FIG. 12A corresponds to a first thumb key for the right hand named "RT1." Each instance of an exemplary symbol system is shown in relation to its particular key pattern in the object space of FIG. 12A.

Figure 12A:
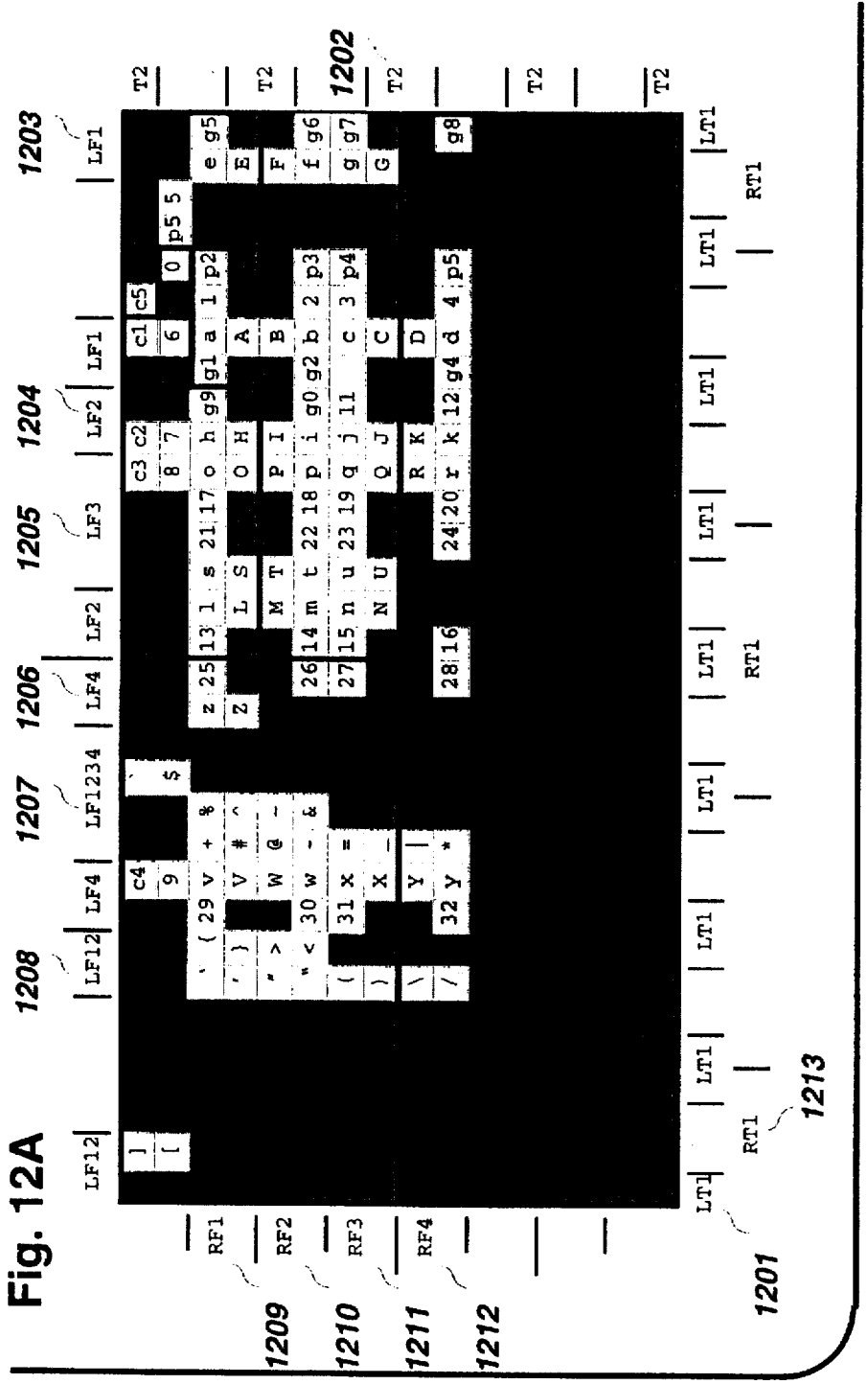
FIGS. 12A–12I show a mixed-resolution, five-dimensional object space illustrating symbol instances associated with key patterns for a symbol system configuration in an adaptive chordal keyboard system.
Figure 12B:
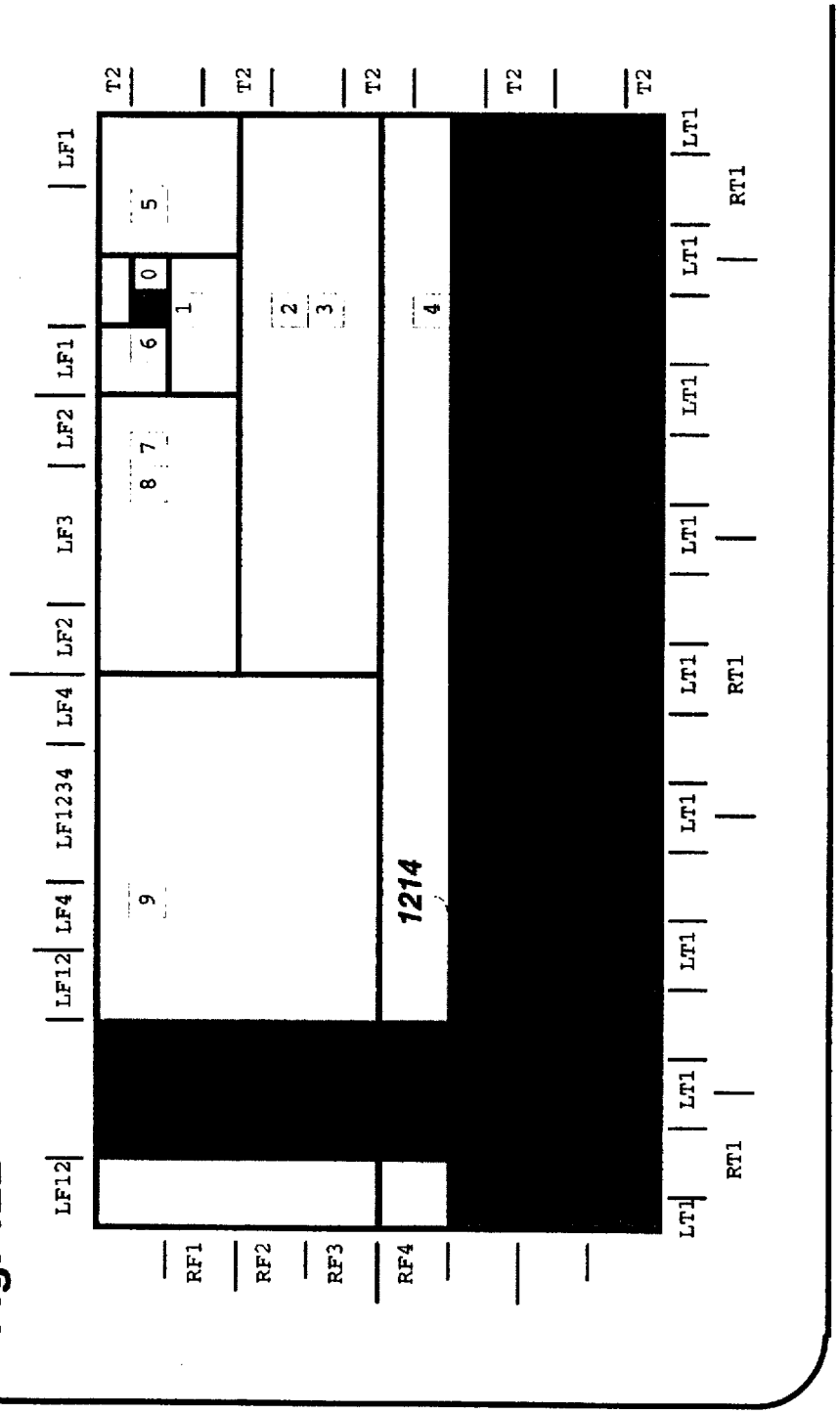
Figure 12C:
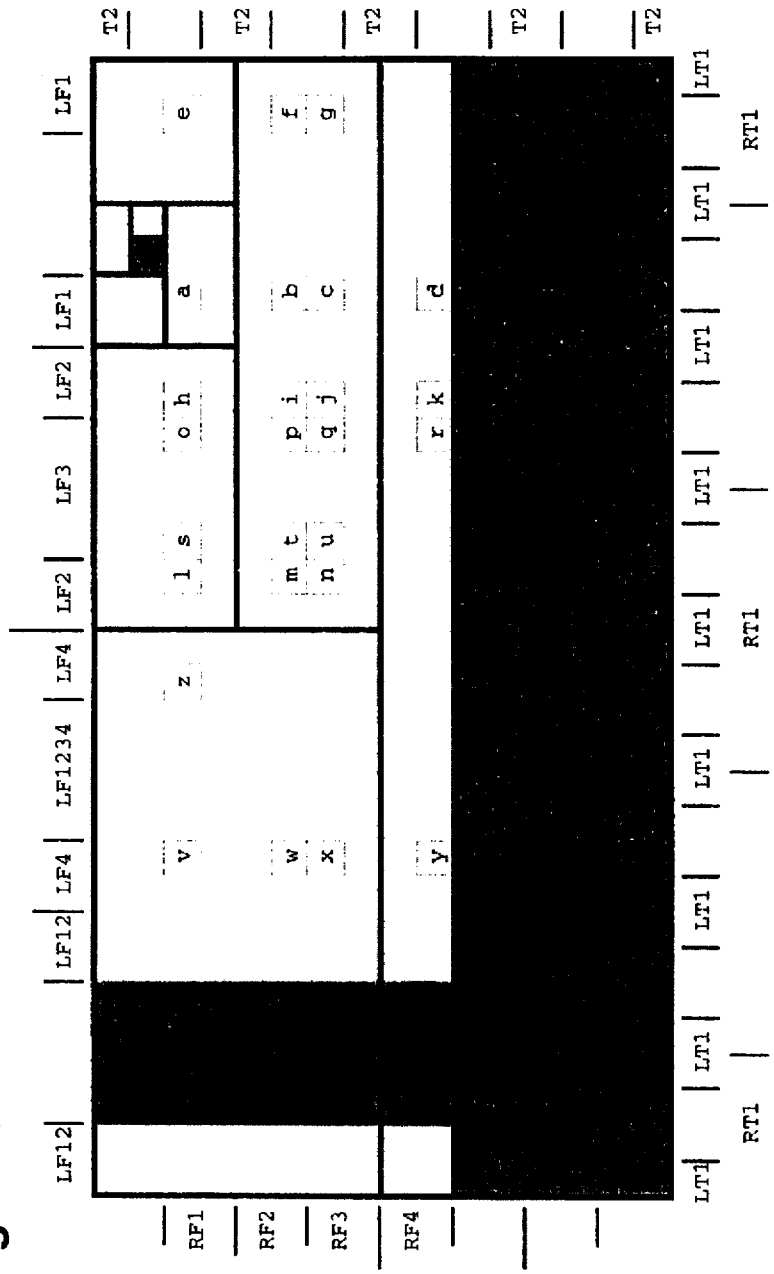
Figure 12D:
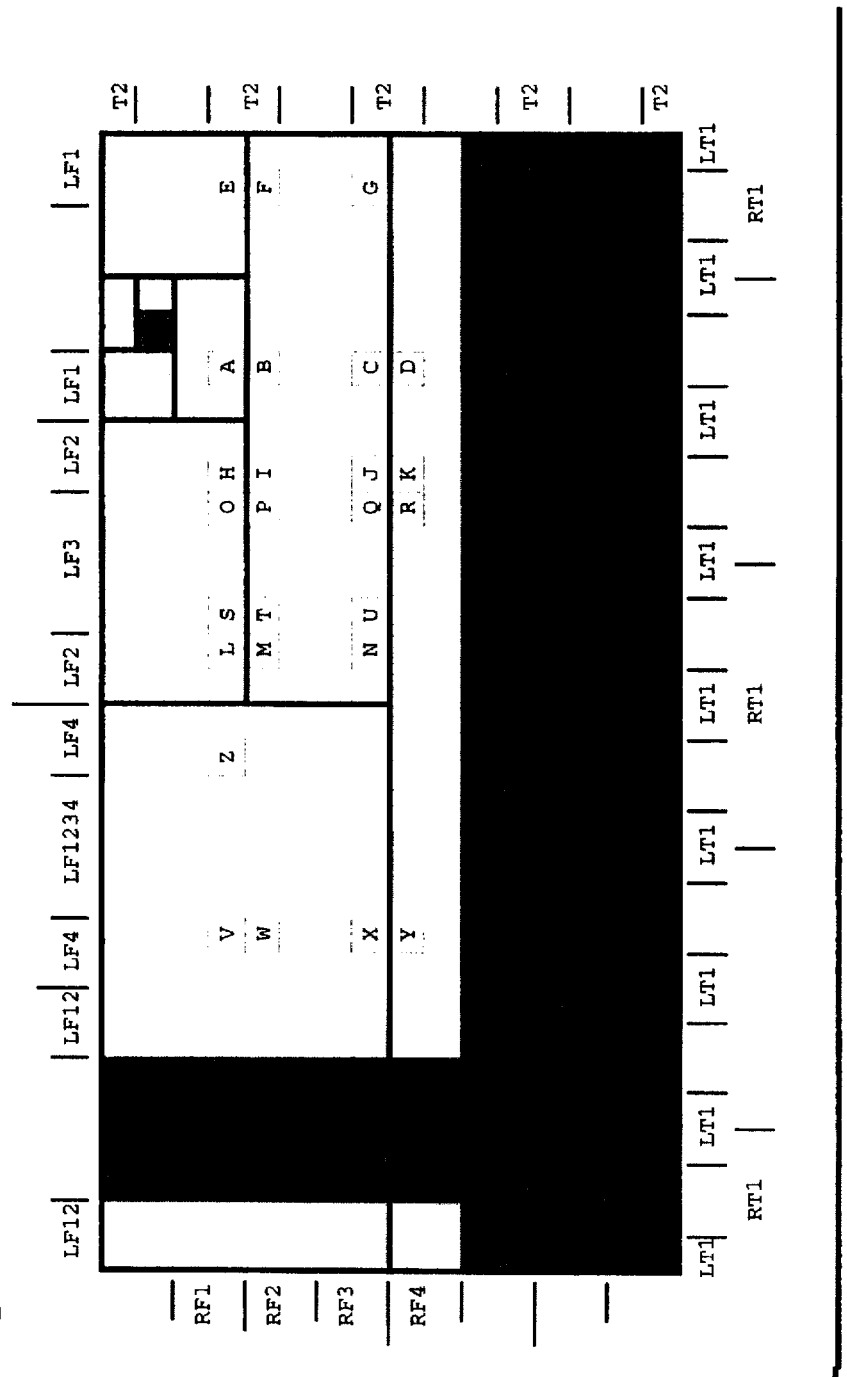
Figure 12E:
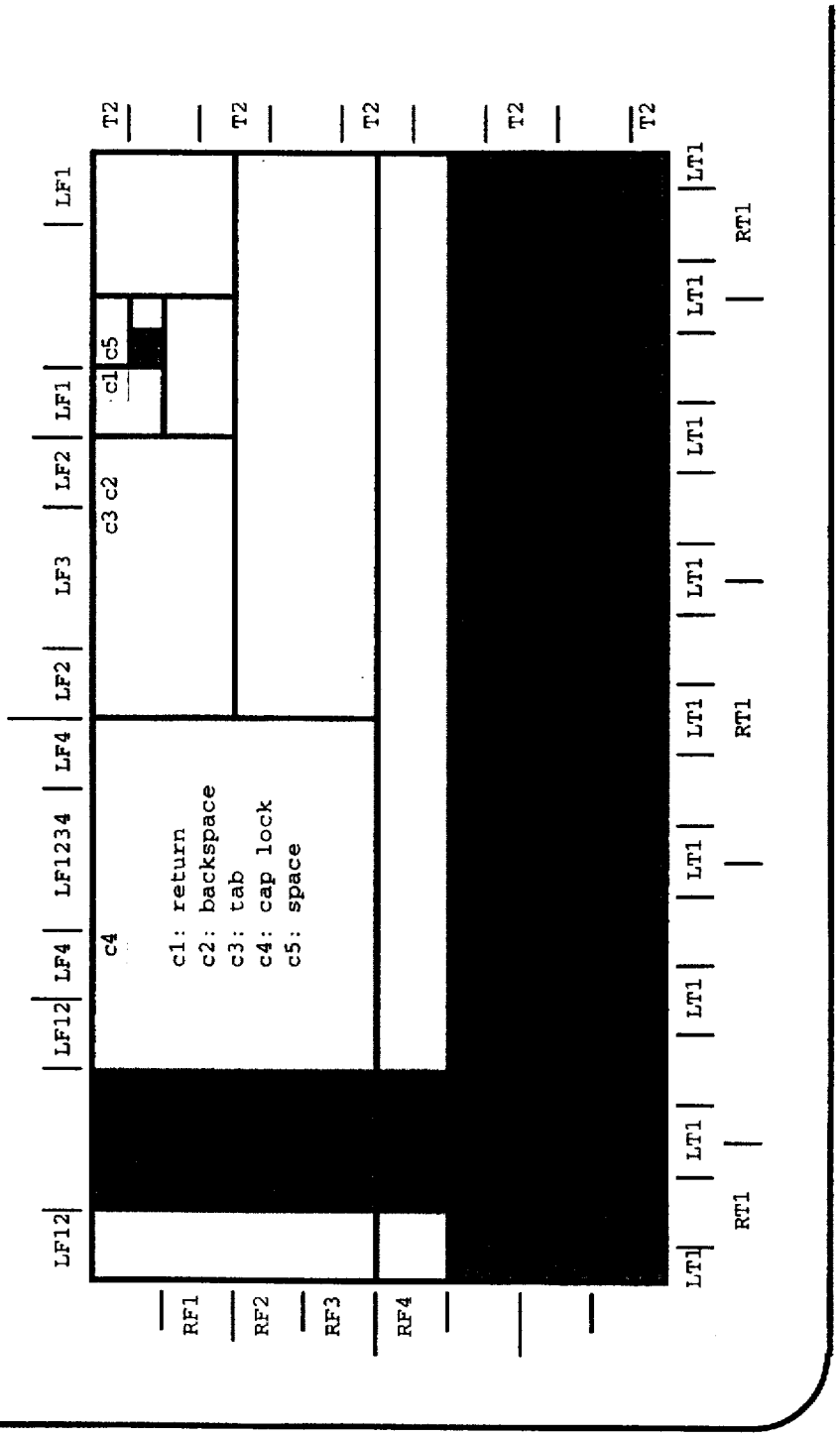
Figure 12F:
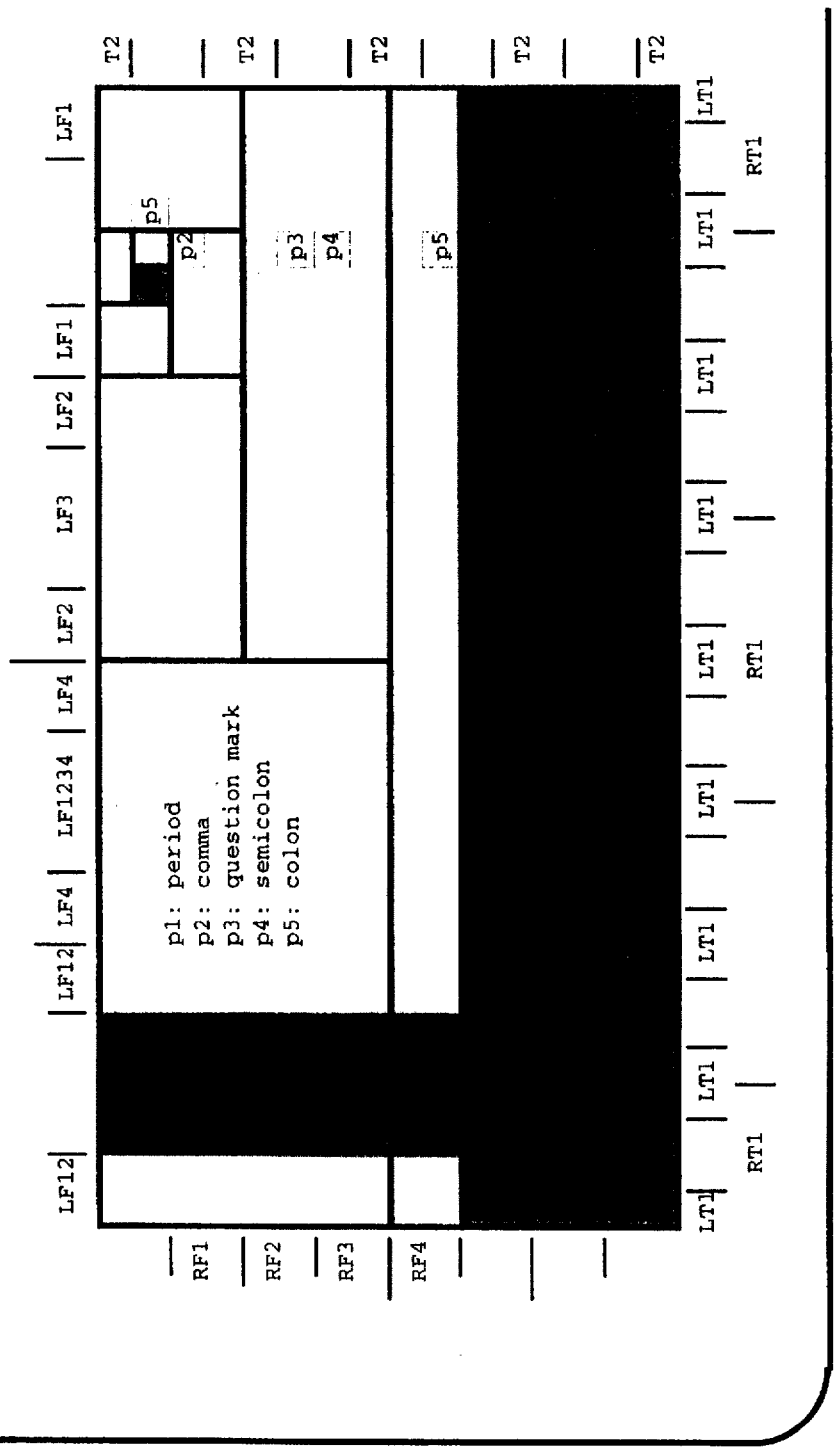
Figure 12G:
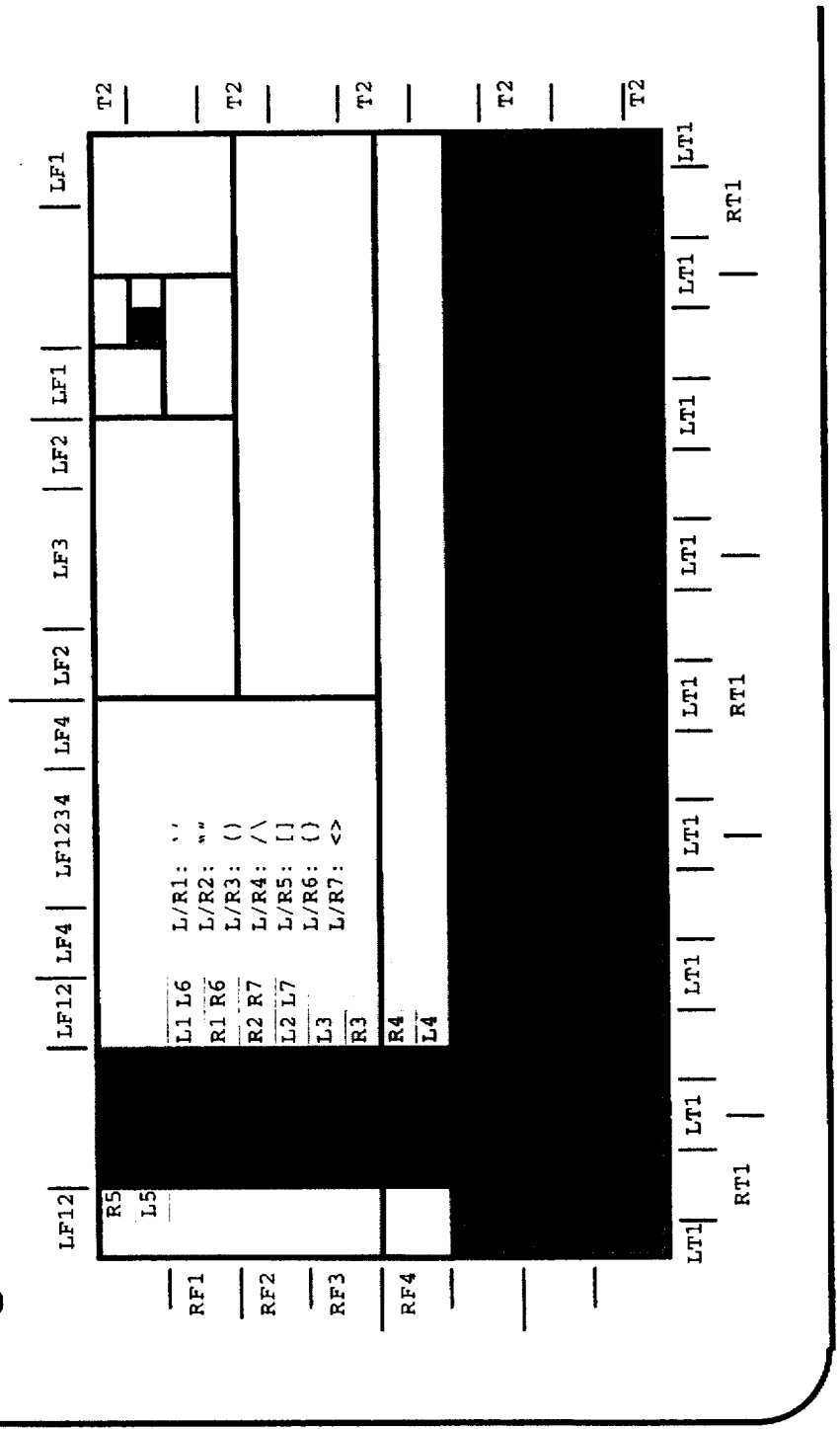
Figure 12H:
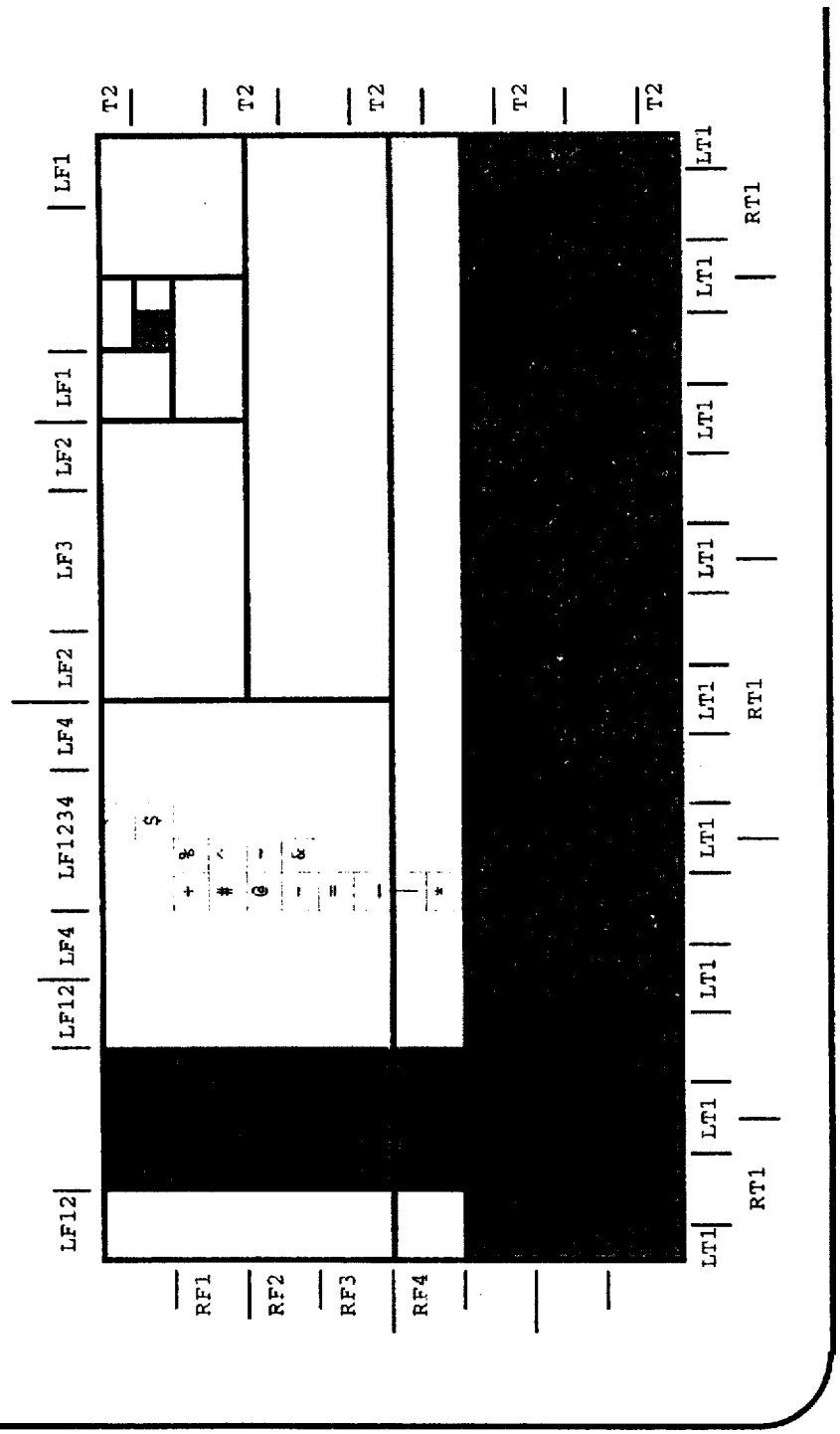
Figure 12I:
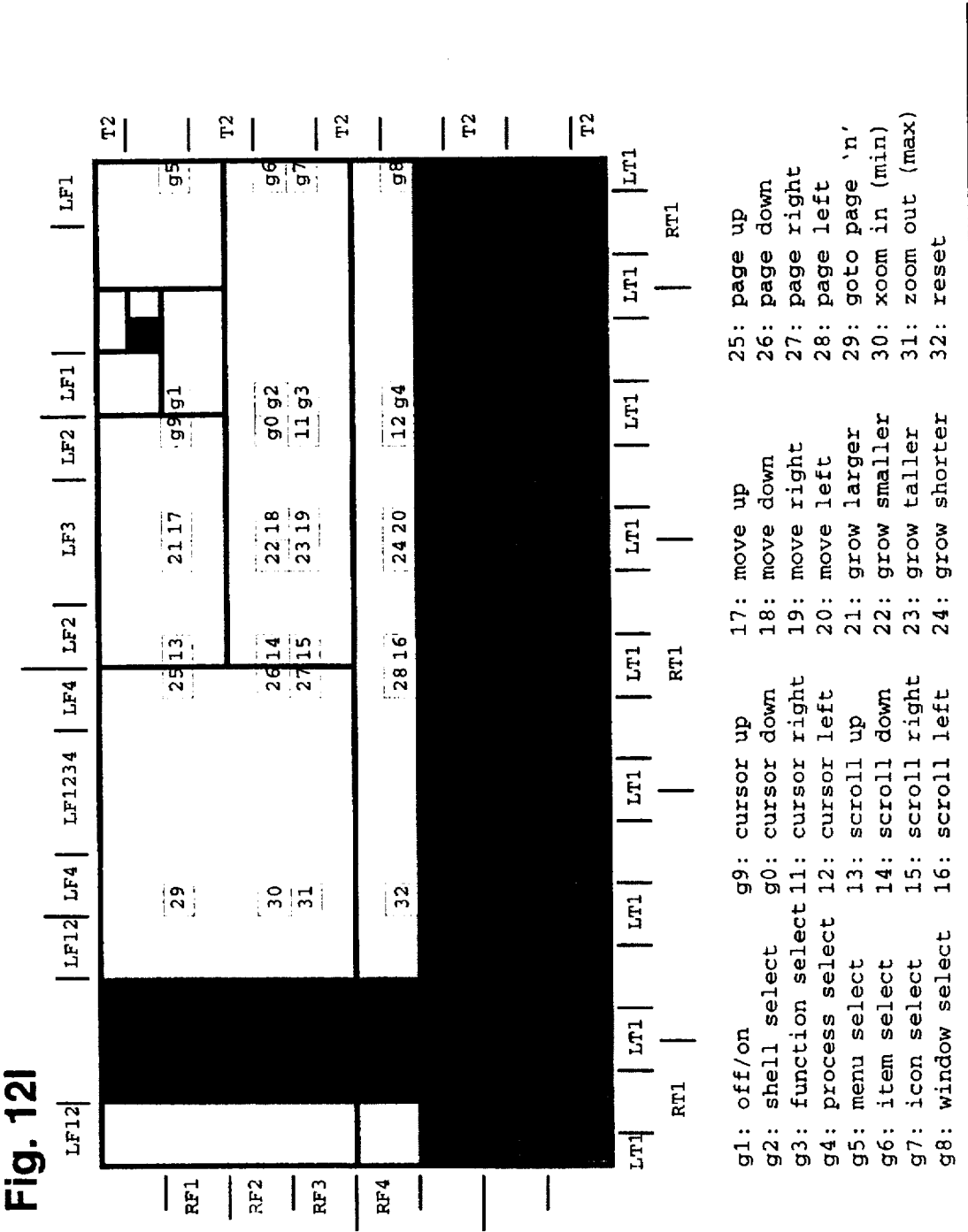

FIG. 12B is a view of the object space of FIG. 12A which shows the digit symbol set and its respective key patterns. The shaded region 1214 of FIGS. 12B–12I corresponds to unnamed properties of dimensional attributes. The remaining white space regions comprise the space of possible key combinations which may or may not be associated with symbol instances. FIGS. 12C and 12D are views of the object space of FIG. 12A which show key patterns associated with the lower and upper case symbol sets. FIG. 12E is a view of the object space of FIG. 12A which shows the local control symbol set and respective key patterns. FIG. 12F is a view of the object space of FIG. 12A which shows key patterns associated with instances of a special character symbol set which may be used for punctuation. FIG. 12G is a view of the object space of FIG. 12A which shows instances of a symbol set comprising special characters that are often paired along with their respective key patterns. FIG. 12H is a view of the object space of FIG. 12A which shows key patterns associated with instances of a miscellaneous special character symbol set. FIG. 12I is a view of the object space of FIG. 12A which shows the global control symbol set and respective key patterns.

In the context of photonic key sensors, the associative network apparatus of the present invention may further comprise a plurality of actuator means, first memory means, second memory means, and adaptively reconfigurable controlling means. The photonic key sensor embodiment of the associative network apparatus may further comprise light emitting means. The actuator means may further include light sensitive means and logic means.

The plurality of actuator means are electrically coupled to the data bus. First memory means is electrically coupled to the plurality of actuator means. Second memory means is electrically coupled to the plurality of actuator means. Adaptively reconfigurable controlling means is electrically coupled to the plurality of actuator means. Light sensitive means is mounted to the plurality of actuator means. Logic means is electrically coupled to light sensitive means.

The plurality of actuator means form logically-related input activations. First memory means store a first state corresponding to a quiescent state for a particular actuator, and a second state corresponding to an activation event for a particular actuator. Second memory means store a first state corresponding to a quiescent state or an activation state for a particular actuator, and a second state corresponding to a deactivation event for a particular actuator. Light sensitive means is responsive to light emitting means. Logic means logically couples light sensitive means to first and second memory means. Light emitting means momentarily activates, in response to an activation event, the light sensitive means, and then deactivates, in response to a deactivation event the light sensitive means, sensing a single activation/deactivation event as two separate states. Adaptively reconfigurable controlling means, in response to a plurality of logically-related input activations, controls asynchronously formed messages to permit any number of actuator means, including all actuator means, to be activated and deactivated simultaneously or sequentially in any sequence.

Figure 13A:
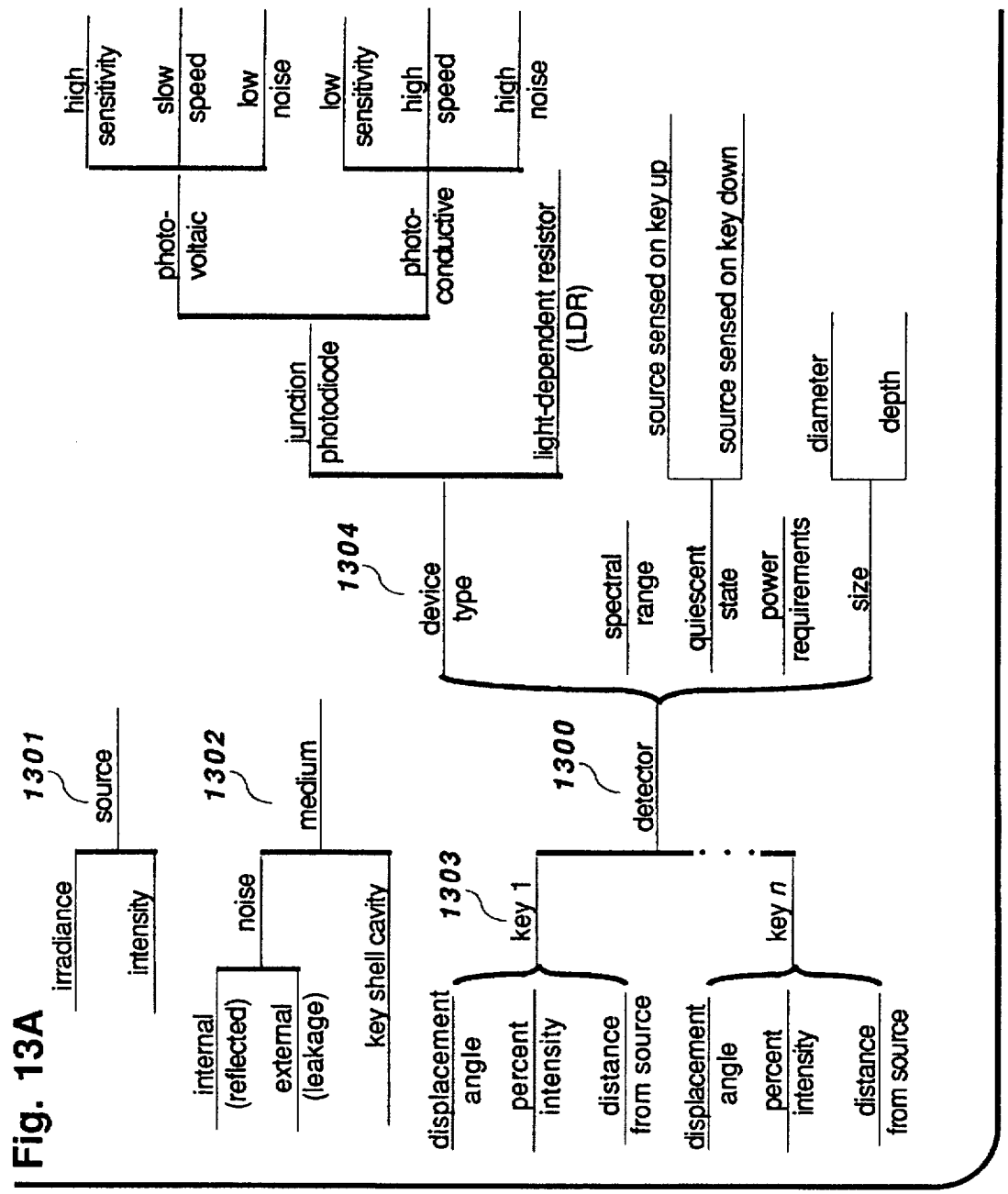
FIGS. 13A and 13B illustrate the relationship between a plurality of photonic key sensors having characteristics corresponding to the key-state transition control problem when actuated at varying intervals resulting from their proximity to a common light source in the "free-space" medium of a key shell cavity.
Figure 13B:
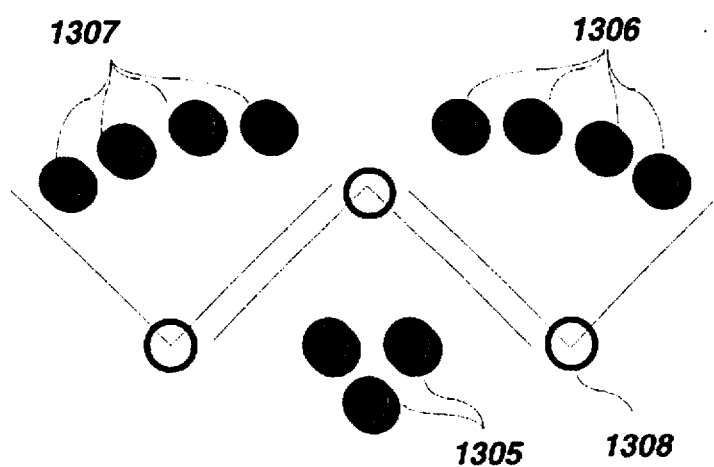

In accordance with the present illustrative embodiment of the invention, FIGS. 13A and 13B illustrate the relationship between a plurality of photonic key sensors 1300 having characteristics corresponding to the key-state transition control problem when actuated at varying intervals resulting from their proximity to a common light source 1301 in the "free-space" medium 1302 of a key shell cavity. Light-sensitive devices 1304 are fixed to the side of a key-shaft enclosure 1305–1307. The key shaft enclosure has an opening on a side opposite the light-sensitive device 1304 to permit light energy broadcast in a key shell cavity from a common source 1301, 1308 to pass through the enclosure to activate a detector 1300 when a key 1303 is pressed or released. As discussed earlier, the transition control problem is due to variations in detector response to broadcast source irradiance as a result of varying distance from the broadcast source and the potential for double sensing of a single state. By positioning a detector vertically along a key shaft enclosure such that a key press and a key release both cause the common light source to momentarily activate and deactivate the detector, a single key activation/deactivation event is sensed as two separate states. A key pattern event, however, is generated when a subsequent key release state is sensed for each of a plurality of sensed key press states. By associating press/release state transition means with each key, a transition control method can be adaptively structured in accordance with the user capability and preference configurations described above.

It will be apparent to those skilled in the art that various modifications can be made to the polymorphic control method and apparatus of the instant invention without departing from the scope or spirit of the invention, and it is intended that the present invention cover modifications and variations of the polymorphic control method and apparatus provided they come within the scope of the appended claims and their equivalents.

I claim:

1. An associative network apparatus for enabling a plurality of elements arranged in a fixed physical configuration to be dynamically reconfigured, responsive to user preferences, into a plurality of logical configurations for recall based on user-selected associations, comprising:

a plurality of input circuits for providing a plurality of input signals, with each of the plurality of input signals having a value corresponding to one of a logical one and a logical zero;

a plurality of electrically-activated elements including,
  a first set of elements, electrically coupled to each of said plurality of input circuits, having an input signal corresponding to a logical one; and
  a second set of elements, electrically coupled to each of said plurality of input circuits, having an input signal corresponding to a logical zero;

a data bus, electrically coupled to each of said plurality of input circuits, for conveying the plurality of input signals to said plurality of electrically-activated elements;

a control bus, electrically coupled to each of said plurality of input circuits, for controlling the plurality of input signals;

an input control circuit, electrically coupled to each of said plurality of input circuits and to said control bus, for controlling the plurality of input circuits; and means for switching a logical polarity of the plurality of input circuits to select, responsive to said input control circuit, a set of elements, the set of elements selected being one of the first set of elements and the second set of elements.

2. The associative network apparatus as set forth in claim 1, said means for switching comprising:

a plurality of logical polarity input switches, each of said plurality of logical polarity input switches electrically coupled to a respective input circuit as a configuration control mechanism, the configuration control mechanism electrically coupled to said plurality of electrically-activated elements for setting and resetting a logical polarity of the respective input circuit, the configuration control mechanism also electrically coupled to said data bus; and a polarity control circuit, electrically coupled to each of said plurality of logical polarity input switches and to said control bus.

3. The associative network apparatus as set forth in claim 2, with said data bus providing a first polarity selection signal for reversing a logical polarity of a respective input circuit, and with said data bus providing a second polarity selection signal for restoring the logical polarity of the respective input circuit.

4. The associative network apparatus of claim 3, with said control bus providing a control signal corresponding to a polarity switch enable signal.

5. The associative network apparatus as set forth in claim 2, further comprising:

a plurality of selection level input circuits, each of said plurality of selection level input circuits electrically coupled to each of said plurality of electrically-activated elements and to said data bus for setting and resetting an activation selection level;

a selection level control circuit, electrically coupled to the control bus and to each of said plurality of selection level input circuits, for controlling said plurality of selection level input circuits; and a multiplicity of electrically-activated elements within said plurality of electrically-activated elements selected responsive to a set of input signals comprising a partial logical name corresponding to the selected multiplicity of electrically-activated elements.

6. The associative network apparatus as set forth in claim 2, further comprising:

a network element set/reset input circuit, electrically coupled to each of said plurality of electrically-activated elements and to said data bus for setting and resetting a state of a selected element; and a network element set/reset control circuit, electrically coupled to the control bus and to said network element set/reset input circuit, for controlling said network element set/reset input circuit.

7. The associative network apparatus as set forth in claim 6 with said network element set/reset input circuit, responsive to said network element set-reset control circuit, for globally resetting a state of each of said plurality of electrically-activated elements to a known state.

8. The associative network apparatus as set forth in claim 2, further comprising:

a plurality of output pattern circuits electrically coupled to said data bus, each of said plurality of output pattern circuits electrically coupled to each of said plurality of electrically-activated elements;

an output pattern control circuit, electrically coupled to said control bus and to said plurality of output pattern circuits; and a plurality of logical polarity output switches, electrically coupled to said plurality of logical polarity input switches, respectively, for controlling logical polarity states for output patterns in correspondence with logical polarity states of input patterns.

9. The associative network apparatus as set forth in claim 8, further comprising:

a plurality of output configuration circuits electrically coupled to said data bus and to said plurality of output pattern circuits;

a plurality of gated buffer control circuits electrically coupled between said plurality of output configuration circuits and said plurality of output pattern circuits, respectively;

an output configuration control circuit electrically coupled to said control bus and to said plurality of output configuration circuits;

each of said plurality of input circuits configurable as at least one of an input and an output for relating a plurality of input patterns to a corresponding plurality of output patterns, respectively.

10. An interactive network apparatus, arranged in a fixed physical configuration, dynamically reconfigurable to a plurality of logical configurations for user-selected associative recall, comprising:

a plurality of electrically-activated elements;

a plurality of input circuits, electrically coupled to said plurality of electrically-activated elements;

a data bus, electrically coupled to each of said plurality of input circuits, for transmitting a plurality of input signals, with a particular set of input signals comprising a logical name corresponding to and activating a particular electrically-activated element of said plurality of electrically-activated elements;

a control bus, electrically coupled to each of said plurality of input circuits, for enabling the plurality of input signals;

a plurality of logical polarity input switches, each of said plurality of logical polarity input switches electrically coupled to a respective input circuit as a configuration control mechanism, the configuration control mechanism electrically coupled to said plurality of electrically-activated elements for setting and resetting a logical polarity of the respective input circuit to determine a network configuration based on a logical polarity of input patterns, the configuration control mechanism also electrically coupled to said data bus and to said control bus;

a polarity control circuit, electrically coupled to each of said plurality of logical polarity input switches and to said control bus;

an input control circuit, electrically coupled to each of said plurality of input circuits and to said control bus;

a plurality of selection level input circuits, electrically coupled to said plurality of electrically-activated elements, respectively, and to said data bus, each of said plurality of selection level input circuits responsive to an activation selection level;

a selection level control circuit, electrically coupled to said control bus and to each of said plurality of selection level input circuits, for setting and resetting the activation selection level, the activation selection level allowing a multiplicity of electrically-activated elements to be selected concurrently responsive to a partial logical name corresponding to the multiplicity of electrically-activated elements;

a network element set/reset input circuit, electrically coupled to said plurality of electrically-activated elements and to said data bus, for setting and resetting a state of an electrically-activated element; and a network element set/reset control circuit, electrically coupled to said control bus and to said network element set/reset input circuit for clearing a state set by at least one of said input control circuit, said logical polarity control circuit, said selection level control circuit, and said network element set/reset input circuit and for resetting the state to a known state.

11. The interactive network apparatus as set forth in claim 10, further comprising:

a plurality of output pattern circuits, electrically coupled between said data bus and said plurality of electrically-activated elements;

an output pattern control circuit, electrically coupled to said control bus and to said plurality of output pattern circuits;

a plurality of logical polarity switches electrically coupled to said plurality of logical polarity input switches, respectively, for controlling logical polarity states of output patterns responsive to the network configuration determined by the logical polarity, of input patterns;

a plurality of output configuration circuits, electrically coupled to said data bus and to said plurality of output pattern circuits;

a plurality of gated buffer control circuits, electrically coupled between said plurality of output configuration circuits and said plurality of output pattern circuits; and an output configuration control circuit, electrically coupled to said control bus and to said plurality of output configuration circuits, for configuring each of said plurality of output circuits as one of a network input and a network output for relating a plurality of input patterns to a corresponding plurality of output patterns.

12. The interactive network apparatus as set forth in claims 9 or 11, further comprising:

a plurality of actuator means with each of said plurality of actuator means coupled to said data bus for forming logically-related input activations;

first memory means coupled to each of said plurality of actuator means for storing a first state corresponding to a quiescent state for a particular actuator and for storing a second state corresponding to an activation event for a particular actuator;

second memory means coupled to each of said plurality of actuator means for storing a first state corresponding to one of a quiescent state and an activation event for a particular actuator and for storing a second state corresponding to a deactivation event for a particular actuator; and adaptively reconfigurable means for controlling asynchronously formed messages responsive to a plurality of logically-related input activations permitting any number of actuator means, including all actuator means, to be activated and deactivated simultaneously or sequentially in any sequence.

13. The interactive network apparatus as set forth in claim 12, further comprising light emitting means and with said plurality of actuator means including:

light sensitive means, mounted to said plurality of actuator means and responsive to said light emitting means; and logic means, electrically coupled to said light sensitive means, for logically coupling said light sensitive means to said first and second memory means;

said light emitting means momentarily activating, responsive to an activation event, said light sensitive means and said light emitting means deactivating, responsive to a deactivation event, said light sensitive means, sensing a single activation/deactivation event as two separate states.

14. A process for dynamically configuring a polymorphic network apparatus and for selecting an element of a plurality of elements configured as an N-dimensional object space, said polymorphic network apparatus including a plurality of input circuits, a data bus with a plurality of signal paths, and a control bus, comprising the steps of:

configuring the plurality of elements for a logical N-dimensional configuration;

inputting, using the data bus, a polarity selection signal for each of the plurality of input circuits;

setting, responsive to a first setting of the polarity selection signals, a logical polarity for each of the plurality of input circuits, respectively;

activating, responsive to the first setting of the logical polarity defining a first partial logical name, a first selected set of elements within the plurality of elements, the first selected set of elements defined by the first partial logical name;

switching responsive to a second setting of the polarity selection signals, a logical polarity for a plurality of input circuits, respectively; and activating, responsive to the second setting of logical polarity defining a second partial logical name, a second selected set of elements within the plurality of elements, the second selected set of elements defined by the second partial logical name.

15. A process for dynamically configuring a polymorphic network apparatus having a plurality of elements, arranged in a fixed physical configuration, into a plurality of logical configurations for associative recall, said polymorphic network apparatus including a plurality of input circuits, a data bus with a plurality of signal paths, and a control bus, comprising the steps of:

configuring a plurality of elements arranged in a fixed, physical, network configuration for a logical N-dimensional configuration;

inputting one of a first polarity selection signal and a second polarity selection signal for each of the plurality of signal paths, with the first polarity selection signal corresponding to reversing a logical polarity of a related input circuit and the second polarity selection signal corresponding to restoring the logical polarity of the related input circuit;

inputting a control signal on the control bus corresponding to a polarity switch enable signal, with the plurality of signal paths accessed by a plurality of polarity control switches;

inputting an output pattern configuration signal, corresponding to an input data pattern, on the data bus;

inputting a control signal, corresponding to an input/output pattern configuration enable signal, on the control bus with the plurality of signal paths accessed by a plurality of output pattern configuration circuits; and associating, during a configuration phase of an associative process, active signals corresponding to wanted input patterns and distinguishing the active signals corresponding to wanted input patterns from signals corresponding to unwanted input patterns.

16. The process as set forth in claim 15 further comprising the steps of:

inputting a reference pattern signal, corresponding to an input pattern and an associated output pattern, on the data bus;

inputting a control signal, corresponding to an input pattern enable signal, on the control bus with the plurality of signal paths accessed by a plurality of input circuits; and associating, during a configuration phase of an associative process, wanted input patterns with output patterns corresponding to wanted responses.

17. The process as set forth in claim 16 further comprising the steps of:

inputting an input pattern signal, corresponding to an input data pattern, on the data bus;

inputting a control signal, corresponding to an input data pattern enable signal, on the control bus with the plurality of signal paths accessed by a plurality of input pattern configuration circuits;

forming, during an operational phase of a previously configured associative network, input patterns from signals produced by a plurality of activated inputs;

filtering selected input patterns from a set of possible input patterns; and determining output patterns in response to a particular set of connections between input and output signals.

18. The process as set forth in claim 17 further comprising the steps of:

inputting a control signal, corresponding to an output pattern enable signal, on the control bus with the plurality of signal paths accessed by a plurality of output pattern circuits; and obtaining output patterns in response to a particular set of connections between input and output signals.

19. A process for dynamically configuring and operating a dynamically reconfigurable polymorphic network for mapping a first set of codewords to a second set of codewords, said polymorphic network apparatus including a plurality of input circuits, a data bus having a plurality of signal paths, and a control bus, comprising the steps of:

configuring a plurality of elements arranged in a fixed, physical network configuration for a logical N-dimensional configuration;

inputting one of a first polarity selection signal and a second polarity selection signal for each of the plurality of signal paths with the first polarity selection signal corresponding to reversing a logical polarity of a related input circuit and the second polarity selection signal corresponding to restoring the logical polarity of the related input circuit;

inputting a control signal, corresponding to a polarity switch enable signal, on the control bus with the plurality of signal paths accessed by a plurality of polarity control switches;

inputting an output pattern configuration signal, corresponding to an input data pattern, on the data bus;

inputting a control signal, corresponding to an input/output pattern configuration enable signal, on the control bus with the plurality of signal paths accessed by a plurality of output pattern configuration circuits;

inputting a reference pattern signal, corresponding to an input pattern and an associated output pattern, on the data bus;

inputting a control signal, corresponding to an input pattern enable signal, on the control bus with the plurality of signal paths accessed by the plurality of input circuits; and generating, responsive to a particular input pattern of said first set of codewords, an output pattern of said second set of codewords.

20. A process for adaptively configuring a keyboard for particular user capabilities and preferences using an associative network apparatus including a data bus having a plurality of signal paths, a control bus, and a plurality of electrically-activated elements arranged in a fixed, physical network configuration, with user capabilities and preferences determining a range of available key layout configurations, the process comprising the steps of:

a. configuring the plurality of electrically-activated elements for a mixed resolution, N-dimensional logical configuration;

b. inputting on the data bus an output pattern configuration signal, corresponding to an input data pattern, representing a plurality of operational states;

c. inputting on the control bus a control signal, corresponding to an input/output pattern configuration enable signal, with the plurality of signal paths accessed by a plurality of output pattern configuration circuits;

d. inputting on the data bus a first reference pattern signal, corresponding to an input pattern representing a first set of user preferences and capabilities and an associated output pattern representing one of a plurality of operational states;

e. inputting on the control bus a control signal, corresponding to an input pattern enable signal, with the plurality of signal paths accessed by a plurality of input circuits;

f. inputting on the data bus a next reference pattern signal, corresponding to an input pattern representing a next set of user preferences and capabilities and an associated output pattern representing one of a plurality of operational states;

g. inputting on the control bus a control signal, corresponding to an input pattern enable signal, with the plurality of signal paths accessed by a plurality of input circuits; and h. repeating steps f and g for configuring an association between all desired reference patterns for user preferences and capabilities and associated respective output patterns.

21. The process as set forth in claim 20, with a particular user's capabilities and preferences for operating a keyboard determining a range of available key input patterns for a particular key layout configuration, for adaptively configuring a keyboard for user capabilities and preferences relating to the digits of one hand, the process further comprising the steps of:

inputting on the data bus an input pattern signal corresponding to an input data pattern representing a particular user's ability to press and release a combination of keys for an input key pattern; and inputting on the control bus a control signal corresponding to an input data pattern enable signal, with the plurality of signal paths accessed by a plurality of input pattern configuration circuits.

22. A process for adaptively configuring a keyboard for user capabilities and preferences relating to the digits of one hand, using a reconfigurable associative network apparatus including a data bus having a plurality of signal paths, a control bus, and a plurality of elements arranged in a fixed, physical network configuration, comprising the steps of:

a. configuring the plurality of elements for a logical N-dimensional configuration with each dimension corresponding to a two-state key activation associated with a particular digit of one hand;
  b. inputting, on the data bus, an output pattern configuration signal corresponding to an input data pattern representing a response to a plurality of possible key activations for an input key pattern;
  c. inputting, on the control bus, a control signal corresponding to an input/output pattern configuration enable signal, with the plurality of signal paths accessed by a plurality of output pattern configuration circuits;
  d. inputting, on the data bus, a first reference pattern signal corresponding to an input pattern representing a first combination of keys for an input key pattern;
  e. inputting, on the control bus, a control signal corresponding to an input pattern enable signal, with the plurality of signal paths accessed by a plurality of input circuits;
  f. inputting, on the data bus, a next reference pattern signal corresponding to an input pattern representing a next combination of keys for an input key pattern;
  g. inputting, on the control bus, a control signal corresponding to an input pattern enable signal, with the plurality of signal paths accessed by a plurality of input circuits; and
  h. repeating steps f and g for configuring an association between a plurality of combinations of keys for input key patterns and a respective plurality of output patterns.

23. The process as set forth in claim 22 for adaptively configuring a keyboard for particular key patterns representing input and output pattern associations corresponding to input patterns formed by key activations of a first hand, further comprising the step of:

repeating steps a through h for adaptively configuring key patterns representing input and output pattern associations corresponding to input patterns formed by key activations of a second hand;
  forming, for particular key patterns of a first hand, input patterns associated with output patterns corresponding to a first component of a structured symbol name and, for particular key patterns of a second hand, forming input patterns associated with output patterns corresponding to a second component of a structured symbol name, and with said first and second components of a structured symbol name further corresponding to particular symbol set instances of a symbol system.

24. The process as set forth in claim 23, further comprising the steps of:

inputting on the data bus a first input pattern signal corresponding to an input data pattern representing key patterns formed by key activations of a first hand; and
  inputting on the data bus a second input pattern signal corresponding to an input data pattern representing key patterns formed by key activations of a second hand;

inputting on the control bus a control signal corresponding to an input data pattern enable signal, with the plurality of signal paths accessed by a plurality of input pattern configuration circuits; and
  determining output patterns corresponding to first and second components of a structured symbol name for particular symbol set instances of a symbol system.

25. A process for adaptively configuring a plurality of logically-related input activations permitting any number of actuator means, including all actuator means, to be activated and deactivated simultaneously or sequentially in any sequence, for configuring an associative network apparatus for controlling asynchronously formed message transitions in response to a plurality of logically-related input activations, comprising the steps of:

a. configuring a plurality of elements arranged in a fixed, physical network configuration for a logical N-dimensional configuration with each dimension corresponding to a two-state key activation;
  b. inputting an output pattern configuration signal on a data bus corresponding to an input data pattern representing a response to a plurality of possible key activations for an input key pattern;
  c. inputting a control signal on a control bus corresponding to an input/output pattern configuration enable signal, with a plurality of signal paths within the data bus accessed by a plurality of output pattern configuration circuits;
  d. inputting a first reference pattern signal on the data bus corresponding to an input pattern corresponding to a first combination of keys for an input key pattern;
  e. inputting a control signal on the control bus corresponding to an input pattern enable signal, with the plurality of signal paths accessed by a plurality of input circuits;
  f. inputting a next reference pattern signal on the data bus corresponding to an input pattern corresponding to a next combination of keys for an input key pattern;
  g. inputting a control signal on the control bus corresponding to an input pattern enable signal, with the plurality of signal paths accessed by a plurality of input circuits; and
  h. repeating steps f and g for configuring an association between a plurality of reference patterns for possible combinations of keys for input key patterns and respective output patterns.

26. A process for adaptively configuring a keyboard for a particular symbol system, comprising the steps of:

a. configuring a plurality of elements arranged in a fixed, physical network configuration for a mixed-resolution, N-dimensional logical configuration with each dimension corresponding to at least one key pattern;
  b. inputting an output pattern configuration signal on a data bus corresponding to an input data pattern representing a response to a plurality of possible key activations for an input key pattern;
  c. inputting a control signal on a control bus corresponding to an input/output pattern configuration enable signal, with signal paths of the data bus accessed by a plurality of output pattern configuration circuits;
  d. inputting a first reference pattern signal on the data bus corresponding to an input pattern representing a first combination of keys for an input key pattern associated with an instance of a plurality of symbols in a symbol system;

e. inputting a control signal on said control bus corresponding to an input pattern enable signal, with the signal paths of the data bus accessed by a plurality of input circuits;

f. inputting a next reference pattern signal on the data bus corresponding to an input pattern representing a next combination of keys for an input key pattern associated with an instance of a plurality of symbols in a symbol system;

g. inputting a control signal on the control bus corresponding to an input pattern enable signal, with the signal paths of the data bus accessed by a plurality of input circuits; and h. repeating steps f and g for configuring an association between selected reference patterns for possible combinations of keys for input key patterns and respective symbols.

* * * * *